US012615688B2

(12) United States Patent
Elazzouni et al.

(10) Patent No.: US 12,615,688 B2
(45) Date of Patent: Apr. 28, 2026

(54) USER EQUIPMENT DISCONTINUOUS RECEPTION TIMING IN ASSOCIATION WITH A CELL DISCONTINUOUS TRANSMISSION CONFIGURATION AND/OR A CELL DISCONTINUOUS RECEPTION CONFIGURATION

(71) Applicant: QUALCOMM Incorporated, San Diego, CA (US)

(72) Inventors: Sherif Elazzouni, San Diego, CA (US); Hung Dinh Ly, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 18/313,037

(22) Filed: May 5, 2023

(65) Prior Publication Data

US 2024/0373502 A1    Nov. 7, 2024

(51) Int. Cl.
*H04W 76/28*          (2018.01)

(52) U.S. Cl.
CPC .................................... *H04W 76/28* (2018.02)

(58) Field of Classification Search
None
See application file for complete search history.

(56) References Cited

U.S. PATENT DOCUMENTS

| | | | |
|---|---|---|---|
| 2017/0188411 A1* | 6/2017 | Siomina ............ | H04W 52/0216 |
| 2023/0199909 A1* | 6/2023 | Mohammad Soleymani .............. | |
| | | | H04W 52/0216 |
| | | | 370/329 |
| 2024/0237133 A1* | 7/2024 | Jeon ...................... | H04W 76/28 |

OTHER PUBLICATIONS

CMCC: "Discussion on Cell DTX/DRX" , 3GPP Draft, 3GPP TSG-RAN WG2 Meeting #121bis-e, R2-2303792, 3rd Generation Partnership Project, Mobile Competence Centre, 650, Route Des Lucioles, F-06921 Sophia-Antipolis Cedex, France, vol. RAN WG2, No. e-Meeting, Apr 17, 2023-Apr. 26, 2023, Apr. 7, 2023, XP052366049, 5 pages, Sections 1-3.

(Continued)

*Primary Examiner* — Walter J Divito
(74) *Attorney, Agent, or Firm* — Kevin M. Donnelly; Harrity & Harrity, LLP

(57)          ABSTRACT
Various aspects of the present disclosure generally relate to wireless communication. Some aspects relate generally to UE discontinuous reception (DRX) timing in association with a cell discontinuous transmission (DTX) configuration and/or a cell DRX configuration ("cell DTX/DRX configuration"). Some aspects more specifically relate to modifying one or more UE DRX timers in association with a cell DTX cycle and/or a cell DRX cycle ("cell DTX/DRX cycle"). For example, in some aspects, a UE may modify UE DRX timers to maintain a number of activity states in association with the cell DTX/DRX configuration. For example, the UE may maintain a UE active time, a UE DRX inactive time, a cell DTX non-active time, a cell DRX non-active time, and/or a cell DTX/DRX non-active time in association with the cell DTX/DRX configuration.

30 Claims, 12 Drawing Sheets

(56)  References Cited

OTHER PUBLICATIONS

Fraunhofer Iis., et al., "On Cell DTX and DRX", 3GPP Draft, 3GPP TSG RAN WG2 Meeting #121-bis-e, R2-2303257, 3rd Generation Partnership Project, Mobile Competence Centre, 650, Route Des Lucioles, F-06921 Sophia-Antipolis Cedex, France, vol. RAN WG2, No. Online, Apr. 17, 2023-Apr. 26, 2023, Apr. 6, 2023, XP052365522, 9 pages, Sections 1-5.

Huawei., et al., "Outcome of [POST121][312][NES] DTX/DRX—Configuration/ Activation/ Deactivation and Alignment (Huawei)", 3GPP Draft, 3GPP TSG-RAN WG2 #121-bis-e, R2-2302796, 3rd Generation Partnership Project, Mobile Competence Centre, 650, Route Des Lucioles, F-06921 Sophia-Antipolis Cedex, France, vol. RAN WG2, No. Online, Apr. 17, 2023-Apr. 26, 2023, Apr. 7, 2023, XP052365067, pp. 1-33, Sections 1-3.

Intel Corporation: "Further Considerations on Cell DTX and DRX", 3GPP Draft, 3GPP TSG-RAN WG2 Meeting #121bis, R2-2302976, 3rd Generation Partnership Project, Mobile Competence Centre, 650, Route Des Lucioles, F-06921 Sophia-Antipolis Cedex, France, vol. RAN WG2, No. E-Meeting, Apr. 17, 2023-Apr. 26, 2023, Apr. 7, 2023, XP052365246, 6 pages, Sections 1-3.

International Search Report and Written Opinion—PCT/US2024/024318—ISA/EPO—Jul. 4, 2024.

Vivo: "Discussion on Cell DTX-DRX Mechanism", 3GPP Draft, 3GPP TSG-RAN WG2 Meeting #121bis, R2-2303823, 3rd Generation Partnership Project, Mobile Competence Centre, 650, Route Des Lucioles, F-06921 Sophia-Antipolis Cedex, France, vol. RAN WG2, No. E-Meeting, Apr. 17, 2023-Apr. 26, 2023, Apr. 7, 2023, XP052366080, 7 pages, Sections 1-3.

* cited by examiner

400

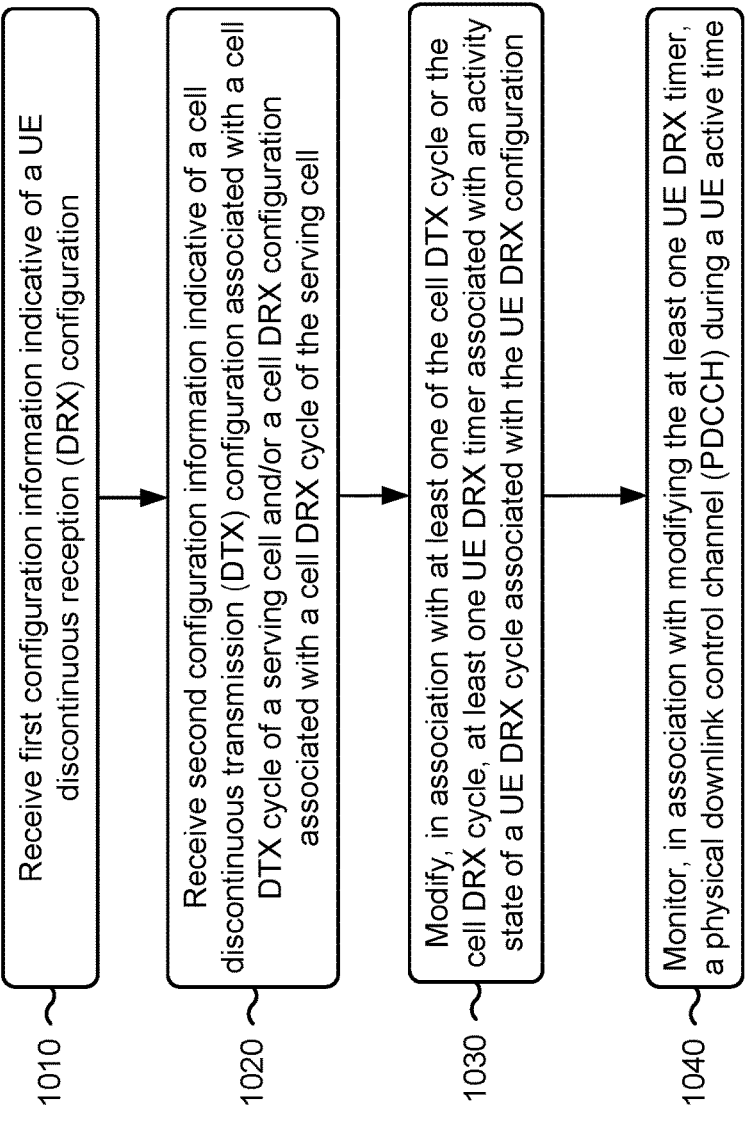

Receive first configuration information indicative of a UE discontinuous reception (DRX) configuration

1010

Receive second configuration information indicative of a cell discontinuous transmission (DTX) configuration associated with a cell DTX cycle of a serving cell and/or a cell DRX configuration associated with a cell DRX cycle of the serving cell

1020

Modify, in association with at least one of the cell DTX cycle or the cell DRX cycle, at least one UE DRX timer associated with an activity state of a UE DRX cycle associated with the UE DRX configuration

1030

Monitor, in association with modifying the at least one UE DRX timer, a physical downlink control channel (PDCCH) during a UE active time

USER EQUIPMENT DISCONTINUOUS RECEPTION TIMING IN ASSOCIATION WITH A CELL DISCONTINUOUS TRANSMISSION CONFIGURATION AND/OR A CELL DISCONTINUOUS RECEPTION CONFIGURATION

FIELD OF THE DISCLOSURE

Aspects of the present disclosure generally relate to wireless communication and specifically relate to techniques and apparatuses for user equipment discontinuous reception timing in association with a cell discontinuous transmission configuration and/or a cell discontinuous reception configuration.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, system bandwidth and/or device transmit power). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, and/or high-precision positioning, among other examples. As the demand for mobile broadband access continues to increase, further improvements in NR may be implemented, and other radio access technologies such as 6G may be introduced to further advance mobile broadband evolution.

A network node may be configured with a cell-specific discontinuous transmission ("DTX") configuration and/or a cell-specific discontinuous reception ("DRX") configuration. In some cases, the network node may operate in accordance with a cell DRX or cell DTX configuration that does not align with a connected mode UE DRX or UE DTX configuration of the UE.

SUMMARY

Some aspects described herein relate to a user equipment (UE) for wireless communication. The user equipment may include at least one memory and at least one processor coupled with the at least one memory. The at least one processor may be operable to cause the user equipment to receive first configuration information indicative of a UE discontinuous reception (DRX) configuration. The at least one processor may be operable to cause the user equipment to receive second configuration information indicative of a cell discontinuous transmission (DTX) configuration associated with a cell DTX cycle of a serving cell and/or a cell DRX configuration associated with a cell DRX cycle of the serving cell. The at least one processor may be operable to cause the user equipment to modify, in association with at least one of the cell DTX cycle or the cell DRX cycle, at least one UE DRX timer associated with an activity state of a UE DRX cycle associated with the UE DRX configuration. The at least one processor may be operable to cause the user equipment to monitor, in association with modifying the at least one UE DRX timer, a physical downlink control channel (PDCCH) during a UE active time.

Some aspects described herein relate to a UE for wireless communication. The user equipment may include at least one memory and at least one processor coupled with the at least one memory. The at least one processor may be operable to cause the user equipment to receive first configuration information indicative of a UE DRX configuration associated with a UE DRX cycle. The at least one processor may be operable to cause the user equipment to receive second configuration information indicative of a cell DTX configuration associated with a cell DTX cycle of a serving cell and/or a cell DRX configuration associated with a cell DRX cycle of the serving cell. The at least one processor may be operable to cause the user equipment to transmit an uplink signal during a cell DTX active time associated with the DTX cycle. The at least one processor may be operable to cause the user equipment to transmit a scheduling request (SR) associated with a retransmission of the uplink signal. The at least one processor may be operable to cause the user equipment to start a UE DRX active time in association with transmitting the SR. The at least one processor may be operable to cause the user equipment to monitor, in association with starting the UE DRX active time, a PDCCH.

Some aspects described herein relate to a method of wireless communication performed by a UE. The method may include receiving first configuration information indicative of a UE DRX configuration. The method may include receiving second configuration information indicative of a cell DTX configuration associated with a cell DTX cycle of a serving cell and/or a cell DRX configuration associated with a cell DRX cycle of the serving cell. The method may include modifying, in association with at least one of the cell DTX cycle or the cell DRX cycle, at least one UE DRX timer associated with an activity state of a UE DRX cycle associated with the UE DRX configuration. The method may include monitoring, in association with modifying the at least one UE DRX timer, a PDCCH during a UE active time.

Some aspects described herein relate to a method of wireless communication performed by a UE. The method may include receiving first configuration information indicative of a UE DRX configuration associated with a UE DRX cycle. The method may include receiving second configuration information indicative of a cell DTX configuration associated with a cell DTX cycle of a serving cell and/or a cell DRX configuration associated with a cell DRX cycle of the serving cell. The method may include transmitting an uplink signal during a cell DTX active time associated with the DTX cycle. The method may include transmitting an SR associated with a retransmission of the uplink signal. The method may include starting a UE DRX active time in association with transmitting the SR. The method may include monitoring, in association with starting the UE DRX active time, a PDCCH.

Some aspects described herein relate to a non-transitory computer-readable medium that stores a set of instructions for wireless communication by a UE. The set of instructions, when executed by one or more processors of the UE, may cause the UE to receive first configuration information indicative of a UE DRX configuration. The set of instructions, when executed by one or more processors of the UE, may cause the UE to receive second configuration information indicative of a cell DTX configuration associated with a cell DTX cycle of a serving cell and/or a cell DRX configuration associated with a cell DRX cycle of the serving cell. The set of instructions, when executed by one or more processors of the UE, may cause the UE to modify, in association with at least one of the cell DTX cycle or the cell DRX cycle, at least one UE DRX timer associated with an activity state of a UE DRX cycle associated with the UE DRX configuration. The set of instructions, when executed by one or more processors of the UE, may cause the UE to monitor, in association with modifying the at least one UE DRX timer, a PDCCH during a UE active time.

Some aspects described herein relate to a non-transitory computer-readable medium that stores a set of instructions for wireless communication by an UE. The set of instructions, when executed by one or more processors of the UE, may cause the UE to receive first configuration information indicative of a UE DRX configuration associated with a UE DRX cycle. The set of instructions, when executed by one or more processors of the UE, may cause the UE to receive second configuration information indicative of a cell DTX configuration associated with a cell DTX cycle of a serving cell and/or a cell DRX configuration associated with a cell DRX cycle of the serving cell. The set of instructions, when executed by one or more processors of the UE, may cause the UE to transmit an uplink signal during a cell DTX active time associated with the DTX cycle. The set of instructions, when executed by one or more processors of the UE, may cause the UE to transmit an SR associated with a retransmission of the uplink signal. The set of instructions, when executed by one or more processors of the UE, may cause the UE to start a UE DRX active time in association with transmitting the SR. The set of instructions, when executed by one or more processors of the UE, may cause the UE to monitor, in association with starting the UE DRX active time, a PDCCH.

Some aspects described herein relate to an apparatus for wireless communication. The apparatus may include means for receiving first configuration information indicative of a UE DRX configuration. The apparatus may include means for receiving second configuration information indicative of a cell DTX configuration associated with a cell DTX cycle of a serving cell and/or a cell DRX configuration associated with a cell DRX cycle of the serving cell. The apparatus may include means for modifying, in association with at least one of the cell DTX cycle or the cell DRX cycle, at least one UE DRX timer associated with an activity state of a UE DRX cycle associated with the UE DRX configuration. The apparatus may include means for monitoring, in association with modifying the at least one UE DRX timer, a PDCCH during a UE active time.

Some aspects described herein relate to an apparatus for wireless communication. The apparatus may include means for receiving first configuration information indicative of a UE DRX configuration associated with a UE DRX cycle.

The apparatus may include means for receiving second configuration information indicative of a cell DTX configuration associated with a cell DTX cycle of a serving cell and/or a cell DRX configuration associated with a cell DRX cycle of the serving cell. The apparatus may include means for transmitting an uplink signal during a cell DTX active time associated with the DTX cycle. The apparatus may include means for transmitting an SR associated with a retransmission of the uplink signal. The apparatus may include means for starting a UE DRX active time in association with transmitting the SR. The apparatus may include means for monitoring, in association with starting the UE DRX active time, a PDCCH.

Aspects generally include a method, apparatus, system, computer program product, non-transitory computer-readable medium, user equipment, base station, network node, network entity, wireless communication device, and/or processing system as substantially described with reference to and as illustrated by the drawings and specification.

The foregoing has broadly summarized some aspects of the present disclosure. Additional aspects and associated advantages will be described hereinafter. The disclosed aspects may be used as a basis for modifying or designing other aspects for carrying out the same purposes of the present disclosure. Such equivalent aspects do not depart from the scope of the appended claims. Characteristics of the aspects disclosed herein, both their organization and method of operation, together with associated advantages will be better understood from the following description when considered in connection with the accompanying drawings. Each of the drawings is provided for the purposes of illustration and description, and not as a definition of the limits of the claims.

BRIEF DESCRIPTION OF THE DRAWINGS

The appended drawings illustrate some aspects of the present disclosure, but are not limiting of the scope of the present disclosure because the description may enable other aspects. The same reference numbers in different drawings may identify the same or similar elements.

FIG. 10 is a flowchart illustrating an example process performed, for example, by a UE that supports DRX configurations in accordance with the present disclosure.

DETAILED DESCRIPTION

Figure 1:
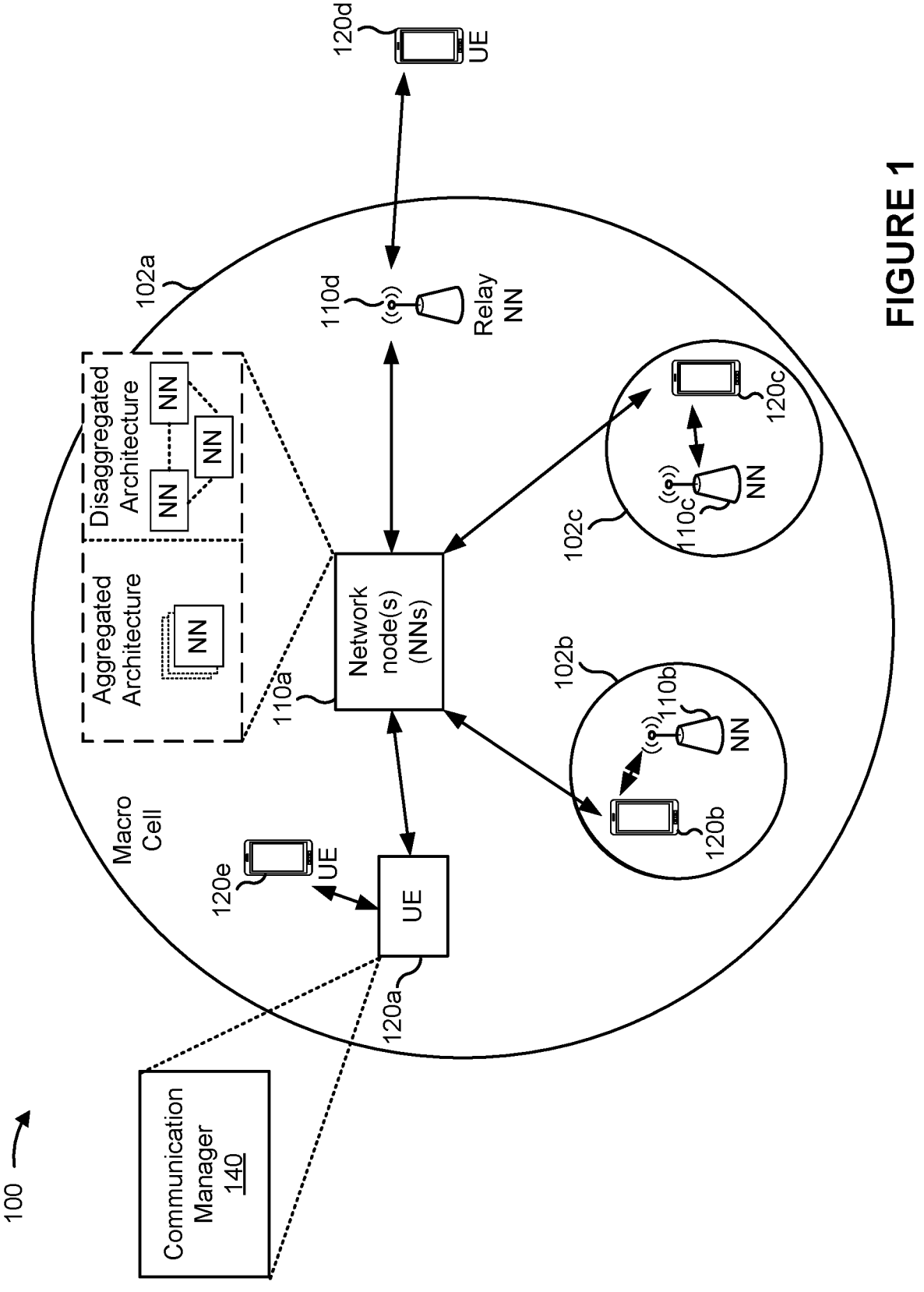
FIG. 1 is a diagram illustrating an example of a wireless network in accordance with the present disclosure.

Various aspects of the disclosure are described hereinafter with reference to the accompanying drawings. However, this disclosure may be embodied in many different forms and is not to be construed as limited to any specific aspect presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using any quantity of the aspects set forth herein. In addition, the scope of the disclosure is intended to cover an apparatus or method that is practiced using another structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to user equipment (UE) discontinuous reception ("DRX") timing in association with a cell discontinuous transmission ("DTX") configuration and/or a cell DRX configuration ("cell DTX/DRX configuration"). Some aspects more specifically relate to modifying one or more UE DRX timers in association with a cell DTX cycle and/or a cell DRX cycle ("cell DTX/DRX cycle"). For example, in some aspects, a UE may modify UE DRX timers to maintain a number of activity states in association with the cell DTX/DRX configuration. For example, the UE may maintain a UE active time (e.g., a UE connected mode-DRX (D-DRX) active time, a UE DRX inactive time (e.g., UE C-DRX inactive time), a cell DTX non-active time, a cell DRX non-active time, and/or a cell DTX/DRX non-active time in association with the cell DTX/DRX configuration. As another example, in some aspects, the UE may allow only a cell DTX configuration by a special cell (SpCell) to affect a UE active time. As another example, the cell DTX/DRX configuration may be configured by cell group. As another example, the UE may stop a UE DRX on duration timer and/or a UE inactivity timer for each DRX group in association with the corresponding cell DTX active time starting during a UE DRX active time. As another example, a UE may refrain from starting a UE DRX active time if an scheduling request (SR) is sent during a cell DTX non-active time. As another example, a dedicated activation communication may be used to activate an aperiodic one-time cell active period for receiving a physical downlink control channel (PDCCH) scheduling retransmission resources in association with an SR transmitted during a cell DTX non-active time.

Particular aspects of the subject matter described in this disclosure can be implemented to realize one or more of the following potential advantages. By maintaining a number of activity states based on modifying UE DRX timers in association with the cell DTX/DRX configuration, the described aspects may enable a UE to synchronize a UE DRX cycle with the cell DTX/DRX configuration, thereby enabling the network node to achieve energy savings by entering a sleep state while minimizing an impact on communications with the UE. By stopping a UE DRX on duration timer and/or a UE inactivity timer for each DRX group in association with a corresponding cell DTX active time starting during a UE DRX active time, the described aspects may enable the UE to receive communications from the network node during the DTX active time, thereby mitigating the potential for missed communications and/or inefficiencies in scheduling. By refraining from starting a UE DRX active time if an SR is sent during a cell non-active time, the described aspects may enable the UE to conserve energy resources that may otherwise be wasted in monitoring for a scheduling communication that would not be transmitted during the cell non-active time. By using a dedicated activation communication to activate an aperiodic one-time cell active period for receiving a PDCCH scheduling retransmission resources in association with an SR transmitted during a cell DTX non-active time, the described techniques may enable efficient retransmission scheduling while maintaining a current cell DTX cycle, thereby enabling a UE to receive scheduled retransmission resources shortly after transmitting the SR. By allowing only a cell DTX configuration by an SpCell to affect a UE active time, the described aspects may enable the UE to synchronize communications with the SpCell without that synchronization being inhibited by a common UE DRX configuration applying to cells with which the UE is less likely to connect, a UE to receive scheduled retransmission resources shortly after transmitting an SR during a cell DTX non-active time. In this way, the described techniques may be used to enable further network energy savings without unnecessarily degrading UE connectivity and reliability.

FIG. 1 is a diagram illustrating an example of a wireless network 100 in accordance with the present disclosure. The wireless network 100 may be or may include elements of a 5G (or NR) network or a 6G network, among other examples. The wireless network 100 may include multiple network nodes 110 (also referred to as network entities), shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

A network node 110 may include one or more devices that enable communication between a UE 120 and one or more components of the wireless network 100. A network node 110 may be, may include, or may be referred to as an NR network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 110 may be a single physical node or may be two or more physical nodes. For example, a network node 110 may be a device or system that implements part of a radio protocol stack, a device or system that implements a full protocol stack (such as a full gNB protocol stack), or a collection of devices or systems that collectively implement the full protocol stack. For example, and as shown, a network node 110 may be an aggregated network node, meaning that the network node 110 may use a radio protocol stack that is physically and logically integrated within a single node in the wireless network 100. For example, an aggregated network node 110 may consist of a single standalone base station or a single TRP that uses a full radio protocol stack to enable or facilitate communication between a UE 120 and a core network of the wireless network 100.

Alternatively, and as also shown, a network node 110 may be a disaggregated network node (sometimes referred to as a disaggregated base station), meaning that the network node 110 may use a protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 110 of the wireless network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A CU may handle user plane functionality (for example, Central Unit-User Plane (CU-UP) functionality), and/or control plane functionality (for example, Central Unit-Control Plane (CU-CP) functionality). A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU may host one or more low PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or low PHY layer functions, such as an FFT, an iFFT, beamforming, or PRACH extraction and filtering, among other examples, based on a functional split, such as a lower layer functional split. In such an architecture, each RU can be operated to handle over the air (OTA) communication with one or more UEs 120.

In some aspects, a network node 110 may include a combination of one or more CUs, one or more DUs, one or more RUs, one or more IAB nodes, one or more Near-Real Time (Near-RT) RAN Intelligent Controllers (RICs), and/or one or more Non-Real Time (Non-RT) RICs in the wireless network 100. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as within a cloud deployment.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may include one or more control channels and one or more data channels. An uplink control channel may be used to transmit uplink control information (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

In some examples, the wireless network 100 may be configured for half-duplex operation and/or full-duplex operation. In half-duplex operation, a network node 110 and/or a UE 120 may only transmit or receive communications during particular time periods, such as during particular slots, symbols, or other time periods. Half-duplex operation may involve time-division duplexing (TDD), in which transmissions of the network node 110 and transmissions of the UE 120 do not occur in the same time periods (that is, the transmissions do not overlap in time). For example, in half-duplex operation, a wireless communication device may perform only one of transmission or reception in a particular time period. In full-duplex operation, a wireless communication device (such as the network node 110 and/or the UE 120) may transmit and receive communications concurrently (for example, in the same time period). In some examples, full-duplex operation may involve frequency-division duplexing (FDD), in which transmissions of the network node 110 are performed on a first frequency and transmissions of the UE 120 are performed on a second frequency different from the first carrier. In FDD, transmissions of the network node 110 and transmissions of the UE 120 can be performed concurrently.

In some examples, the UE 120 and the network node 110 may perform MIMO communication. "MIMO" generally refers to transmitting and receiving multiple data signals (such as multiple layers or multiple data streams) simultaneously over a radio channel. MIMO may exploit multipath propagation. MIMO may be implemented using spatial processing referred to as precoding, or MIMO may be implemented using spatial multiplexing. In some examples, MIMO may support simultaneous transmission to multiple receivers, referred to as multi-user MIMO (MU-MIMO). Some radio access technologies (RATs) may employ advanced MIMO techniques, such as multiple TRP operation (including redundant transmission or reception on multiple TRPs), reciprocity in the time domain or the frequency domain, single-frequency-network (SFN) transmission, or non-coherent joint transmission (NC-JT).

As described above, in some aspects, the wireless network 100 may be, may include, or may be included in an IAB network. In an IAB network, at least one network node 110 may be an anchor network node that communicates with a core network via a wired backhaul link, such as a fiber connection. An anchor network node 110 may also be referred to as an IAB donor (or IAB-donor), a central entity, and/or a CU, among other examples. An IAB network may include one or more non-anchor network nodes 110, sometimes referred to as relay network nodes or IAB nodes (or IAB-nodes). The non-anchor network node 110 may communicate directly with or indirectly with (for example, via one or more non-anchor network nodes) the anchor network node 110 via one or more backhaul links to form a backhaul path to the core network for carrying backhaul traffic. In various deployments, the backhaul links may be wireless links. Anchor network nodes 110 and/or non-anchor network nodes 110 may also communicate directly with one or more UEs 120 via access links, which may be wireless links for carrying access traffic.

As described above, an IAB network includes an IAB donor that may connect to a core network via a wired connection (for example, a wireline backhaul). For example, an Ng interface of an IAB donor may terminate at a core network. Additionally, or alternatively, an IAB donor may connect to one or more devices of the core network that provide a core access and mobility management function (AMF). As described above, an IAB donor may include a CU, which may perform access node controller (ANC) functions and/or AMF functions. The CU may configure a DU of the IAB donor and/or may configure one or more IAB nodes (for example, a mobile termination (MT) function and/or a DU function of an IAB node) that connect to the core network via the IAB donor. A link between an IAB donor and an IAB node or between two IAB nodes may also be referred to as a backhaul link. In some examples, a backhaul link between an IAB donor and an IAB node or between two IAB nodes may be a wireless backhaul link that provides an IAB node with radio access to a core network via an IAB donor, and optionally via one or more other IAB nodes. Thus, a CU of an IAB donor may control and/or configure the entire IAB network (or a portion thereof) that connects to the core network via the IAB donor, such as by using control messages and/or configuration messages (for example, an RRC configuration message or an F1 application protocol (F1AP) message). Access links may facilitate communications between a UE 120 and an IAB donor or between a UE 120 and an IAB node. For example, network resources for wireless communications (such as time resources, frequency resources, and/or spatial resources) may be shared between access links and backhaul links. A backhaul link may be a primary backhaul link or a secondary backhaul link (for example, a backup backhaul link). In some aspects, a secondary backhaul link may be used if a primary backhaul link fails, becomes congested, and/or becomes overloaded, among other examples.

When a first IAB node controls and/or schedules communications for a second IAB node (for example, when the first IAB node provides DU functions for the MT functions of the second IAB node), the first IAB node may be referred to as a parent IAB node of the second IAB node, and the second IAB node may be referred to as a child IAB node of the first IAB node. A child IAB node of the second IAB node may be referred to as a grandchild IAB node of the first IAB node. Thus, a DU function of a parent IAB node may control and/or schedule communications for child IAB nodes of the parent IAB node. In some examples, a DU function may exercise limited control over communications of a grandchild node, such as via indication of soft resources or restricted beams at a child node associated with the grandchild node. In some examples, in an IAB network, a DU may be referred to as a scheduling node or a scheduling component, and an MT may be referred to as a scheduled node or a scheduled component. A parent IAB node may be an IAB donor or an IAB node, and a child IAB node may be an IAB node or a UE 120. Communications of an MT function of a child IAB node may be controlled and/or scheduled by a parent IAB node of the child IAB node.

A network node 110 that relays communications may be referred to as a relay station, a relay network node, or a relay. A relay station may receive a transmission of data from an upstream station (for example, a network node 110 or a UE 120) and send a transmission of the data to a downstream station (for example, a UE 120 or a network node 110). In this case, the wireless network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 may include or may be included in a housing that houses components associated with the UE 120, such as one or more processor components and/or one or more memory components. One or more of the processor components may be coupled with one or more of the memory components and/or other components. For example, the processor components (for example, one or more processors) and the memory components (for example, one or more memories) may be operatively coupled, communicatively coupled, electronically coupled, or electrically coupled with one another.

Some UEs 120 may be considered machine-type communication (MTC) or evolved or enhanced machine-type communication (eMTC) UEs (or further enhanced eMTC (feMTC), or enhanced feMTC (efeMTC), or further evolutions thereof, all of which may be simply referred to as "MTC"). An MTC UE may be, may include, or may be included in or coupled with a robot, an unmanned aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless network 100).

Some UEs 120 may be classified according to different categories in association with different complexities and/or different capabilities. UEs 120 in a first category may facilitate massive IoT in the wireless network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, a UE 120 in the third category (a RedCap UE) may support lower latency communication than a UE 120 in the first category (an NB-IoT UE or an eMTC UE), and a UE 120 in the second category (a mission-critical IoT UE or a premium UE) may support lower latency communication than the UE 120 in the third category. Additionally or alternatively, in some examples, a UE 120 in the third category (a RedCap UE) may support higher wireless communication throughput than a UE 120 in the first category (an NB-IoT UE or an eMTC UE), and a UE 120 in the second category (a mission-critical IoT UE or a premium UE) may support higher wireless communication throughput than the UE 120 in the third category. Additionally or alternatively, in some examples, a UE 120 in the first category (an NB-IoT UE or an eMTC UE) may support longer battery life than a UE 120 in the third category (a RedCap UE), and the UE 120 in the third category may support longer battery life than a UE 120 in the second category (a mission-critical IoT UE or a premium UE).

In some examples, a UE 120 of the third category (a RedCap UE) may have capabilities that satisfy first device or performance requirements (such as parameters specified by Section 4.2.21 of 3GPP Technical Specification 38.306, Release 17) but not second device or performance requirements (such as parameters specified for NR UEs 120 other than UEs 120 of the third category, which may be defined by parameters specified by Section 4 of 3GPP Technical Specification 38.306, Release 17), while a UE 120 of the second category (a mission-critical IoT UE or a premium UE) may have capabilities that satisfy the second device or performance requirements (and also the first device or performance requirements, in some examples). For example, a UE 120 of the third category may support a lower maximum modulation and coding scheme (MCS) (for example, a modulation scheme such as quadrature phase shift keying (QPSK)) than an MCS supported by a UE 120 of the second category (for example, a modulation scheme such as 256-quadrature amplitude modulation (QAM)). As another example, a UE of the third category may support a lower maximum transmit power than a maximum transmit power of a UE of the second category. As another example, a UE 120 of the third category may have a less advanced beamforming capability than a beamforming capability of a UE 120 of the second category (for example, a RedCap UE may not be capable of forming as many beams as a premium UE). As another example, a UE 120 of the third category may require a longer processing time than a processing time of a UE 120 of the second category. As another example, a UE 120 of the third category may include less hardware or less complex hardware (such as fewer antennas, fewer transmit antennas, and/or fewer receive antennas) than a UE 120 of the second category. As another example, a UE 120 of the third category may not be capable of communicating on as wide of a maximum BWP as a UE 120 of the second category.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless network 100. In some other deployments and configurations, a UE 120 (instead of a network node 110) may perform, or collaborate or negotiate with one or more other UEs to perform, scheduling operations, resource selection operations, and/or other operations for sidelink communications.

Downlink and uplink resources may include time domain resources (frames, subframes, slots, and/or symbols), frequency domain resources (frequency bands, frequency carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a downlink control information (DCI) configuration to the one or more UEs 120) and/or reconfigured, which means that a BWP can be adjusted in real-time (or near-real-time) based on changing network conditions in the wireless network 100 and/or based on the specific requirements of the one or more UEs 120. This enables more efficient use of the available frequency domain resources in the wireless network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As indicated above, a BWP may be configured as a subset or a part of a total or full component carrier bandwidth and generally forms or encompasses a set of contiguous common resource blocks (CRBs) within the full component carrier bandwidth. In other words, within the carrier bandwidth, a BWP starts at a CRB and may span a set of consecutive CRBs. Each BWP may be associated with its own numerology (indicating a sub-carrier spacing (SCS) and cyclic prefix (CP)). A UE 120 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 120 within the operating bandwidth of the serving cell while all other BWPs with which the UE 120 is configured are deactivated. On deactivated BWPs, the UE 120 does not transmit or receive any communications.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

As indicated above, a network node 110 may be a terrestrial network node 110 (for example, a terrestrial base station or entity of a disaggregated base station) or an NTN network node 110. For example, the wireless network 100 may include one or more NTN deployments including a non-terrestrial network node, an NTN network node 110, and/or a relay station. In some examples, a relay station in an NTN deployment may be referred to as a "non-terrestrial relay station". An NTN may facilitate access to the wireless network 100 for remote areas that may not otherwise be within a coverage area of a terrestrial network node 110, such as over water or remote areas in which a terrestrial network is not deployed. An NTN may provide connectivity for various applications, including satellite communications, IoT, MTC, and/or other applications. An NTN network node 110 may include a satellite, a manned aircraft system, or an unmanned aircraft system (UAS) platform, among other examples. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, a helicopter, and/or a dirigible, among other examples. A UAS platform may include a high-altitude platform station (HAPS), a balloon, a dirigible, and/or an airplane, among other examples.

An NTN network node 110 may communicate directly and/or indirectly with other entities in the wireless network 100 using NTN communication. The other entities may include UEs 120, other NTN network nodes 110 in the one or more NTN deployments, other types of network nodes 110 (for example, stationary, terrestrial, and/or ground-based network nodes), relay stations, and/or one or more components and/or devices included in or coupled with a core network of the wireless network 100. For example, an NTN network node 110 may communicate with a UE 120 via a service link (for example, where the service link includes an access link). Additionally or alternatively, an NTN network node 110 may communicate with a gateway (for example, a terrestrial node providing connectivity for the NTN network node 110 to a data network or a core network) via a feeder link (for example, where the feeder link is associated with an N2 or an N3 interface). Additionally or alternatively, NTN network nodes 110 may communicate directly with one another via an inter-satellite link (ISL). An NTN deployment may be transparent (for example, where the NTN network node 110 operates in a similar manner as a repeater or relay and/or where an access link does not terminate at the NTN network node 110) or regenerative (for example, where the NTN network node 110 regenerates a signal and/or where an access link terminates at the NTN network node 110).

In some examples, a UE 120 may implement power saving features, such as for UEs 120 in a radio resource control (RRC) connected mode, an RRC idle mode, or an RRC inactive mode. Power saving features may include, for example, relaxed radio resource monitoring (such as for devices operating in low mobility or in good radio conditions), discontinuous reception (DRX), reduced PDCCH monitoring during active times, and/or power-efficient paging reception.

A UE 120 may operate in association with a DRX configuration (for example, indicated to the UE 120 by a network node 110). DRX operation may enable the UE 120 to enter a sleep mode at various times while in the coverage area of a network node 110 to reduce power consumption for conserving battery resources, among other examples. The DRX configuration generally configures the UE 120 to operate in association with a DRX cycle. The UE 120 may repeat DRX cycles with a configured periodicity according to the DRX configuration. A DRX cycle may include a DRX on duration during which the UE 120 is in an awake mode or in an active state, and one or more durations during which the UE 120 may operate in an inactive state, which may be opportunities for the UE 120 to enter a DRX sleep mode in which the UE 120 may refrain from monitoring for communications from a network node 110. Additionally or alternatively, the UE 120 may deactivate one or more antennas, RF chains, and/or other hardware components or devices while operating in the DRX sleep mode.

The time during which the UE 120 is configured to be in an active state during a DRX on duration may be referred to as an active time, and the time during which the UE 120 is configured to be in an inactive state, such as during a DRX sleep duration, may be referred to as an inactive time. During a DRX on duration, the UE 120 may monitor for downlink communications from one or more network nodes 110. If the UE 120 does not detect and/or does not successfully decode any downlink communications during the DRX on duration, the UE 120 may enter a DRX sleep mode for the inactive time duration at the end of the DRX on duration. Conversely, if the UE 120 detects and/or successfully decodes a downlink communication during the DRX on duration, the UE 120 may remain in the active state for the duration of a DRX inactivity timer (which may extend the active time). The UE 120 may start the DRX inactivity timer at a time at which the downlink communication is received. The UE 120 may remain in the active state until the DRX inactivity timer expires, at which time the UE 120 may transition to the sleep mode for an inactive time duration. Additionally or alternatively, the UE 120 may use a DRX cycle referred to as an extended DRX (eDRX) cycle, such as for use cases that are tolerant to latency. An eDRX cycle may include a relatively longer inactive time relative to a baseline DRX cycle (for example, an eDRX cycle may have a lower ratio of active time to inactive time).

The network nodes 110 and the UEs 120 of the wireless network 100 may communicate using the electromagnetic spectrum, which may be subdivided by frequency or wavelength into various classes, bands, carriers, and/or channels. For example, devices of the wireless network 100 may communicate using one or more operating bands. In some aspects, multiple wireless networks 100 may be deployed in a given geographic area. Each wireless network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different from the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

In some aspects, a UE (e.g., the UE 120) may include a communication manager 140. As described in more detail elsewhere herein, the communication manager 140 may receive first configuration information indicative of a UE DRX configuration; receive second configuration information indicative of a cell DTX configuration associated with a cell DTX cycle of a serving cell and/or a cell DRX configuration associated with a cell DRX cycle of the serving cell; modify, in association with at least one of the cell DTX cycle or the cell DRX cycle, at least one UE DRX timer associated with an activity state of a UE DRX cycle associated with the UE DRX configuration; and monitor, in association with modifying the at least one UE DRX timer, a PDCCH during a UE active time. Additionally, or alternatively, the communication manager 140 may perform one or more other operations described herein.

In some aspects, a UE (e.g., the UE 120) may include a communication manager 140. As described in more detail elsewhere herein, the communication manager 140 may receive first configuration information indicative of a UE DRX configuration associated with a UE DRX cycle; receive second configuration information indicative of a cell DTX configuration associated with a cell DTX cycle of a serving cell and/or a cell DRX configuration associated with a cell DRX cycle of the serving cell; transmit an uplink signal during a cell DTX active time associated with the DTX cycle; transmit an SR associated with a retransmission of the uplink signal; start a UE DRX active time in association with transmitting the SR; and monitor, in association with starting the UE DRX active time, a PDCCH. Additionally, or alternatively, the communication manager 140 may perform one or more other operations described herein.

Figure 2:
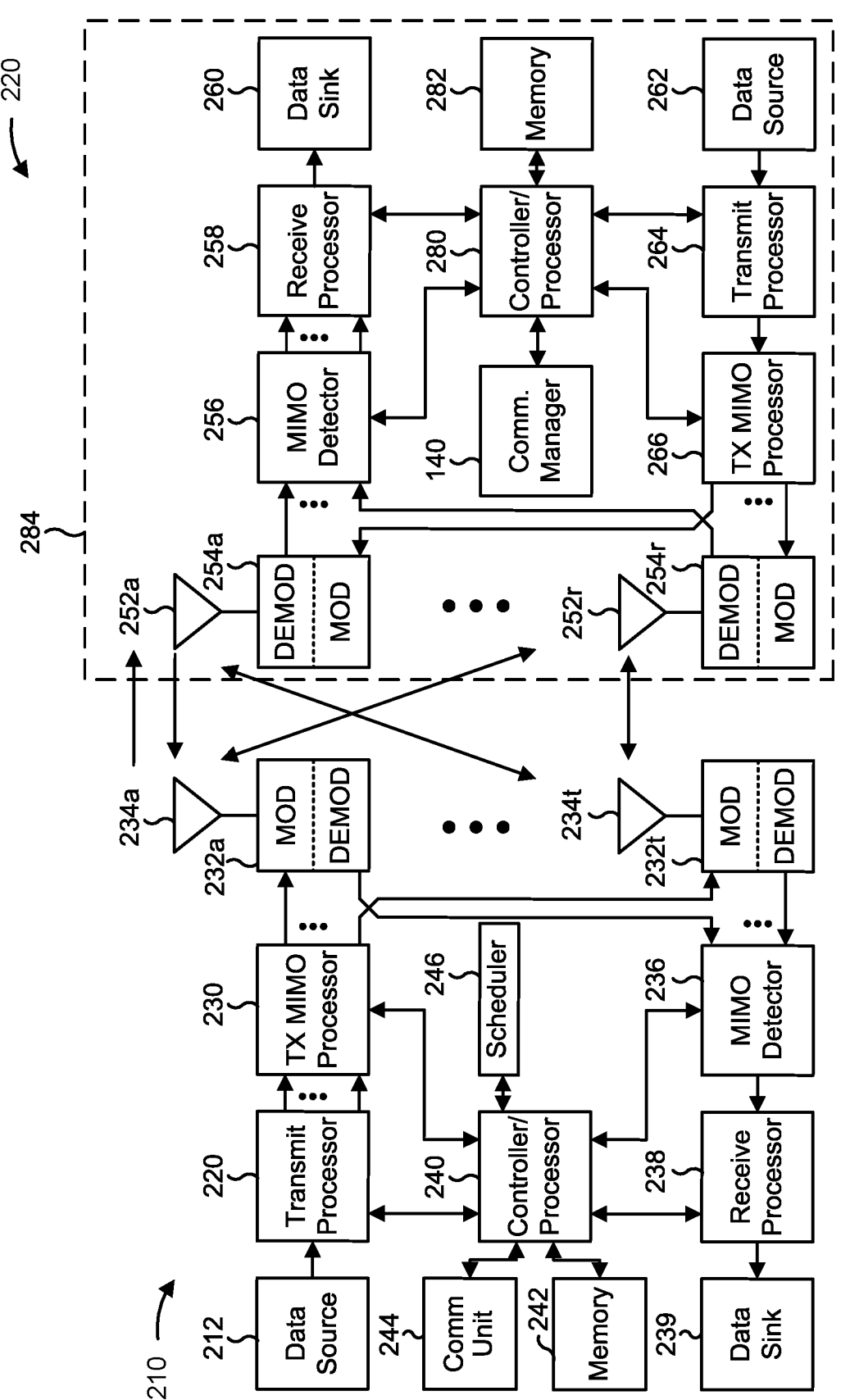
FIG. 2 is a diagram illustrating an example network node in communication with a user equipment (UE) in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150 among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280. In some aspects, a single processor may perform all of the operations described as being performed by the one or more processors. Alternatively, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254r may transmit a set of uplink signals (for example, R uplink signals) via the corresponding set of antennas 252. An uplink signal may include an uplink control information (UCI) communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or a sounding reference signal (SRS) set ID, among other examples. A TCI state information element (sometimes referred to as a TCI state herein) may indicate particular information associated with a beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a ServCellIndex), a bandwidth part identification (bwp-Id), or a reference signal identification, such as a CSI-RS identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, the network may support common TCI state ID update and activation, which may provide common QCL and/or common UL transmission spatial filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some examples, the network may support a layer 1 (L1)-based beam indication using at least UE-specific (unicast) DCI to indicate joint or separate DL/UL beam indications that may be selected from active TCI states. In some examples, DCI formats 1_1 and/or 1_2 may be used for beam indication. The network node 210 may include a support mechanism for the UE 220 to acknowledge successful decoding of a beam indication. For example, the acknowledgment/negative acknowledgment of the PDSCH scheduled by the DCI carrying the beam indication may also be used as an acknowledgement for the DCI.

Further efficiencies in throughput, signal strength, and/or other signal properties may be achieved through beam refinement. For example, the network node 210 may be capable of communicating with the UE 220 using beams of various beam widths. For example, the network node 210 may be configured to utilize a wider beam to communicate with the UE 220 when the UE 220 is in motion because wider coverage may increase the likelihood that the UE 220 remains in coverage of the network node 210 while moving. Conversely, the network node 220 may use a narrower beam to communicate with the UE 220 when the UE 220 is stationary because the network node 210 can reliably focus coverage on the UE 220 with low or minimal likelihood of the UE 220 moving out of the coverage area of the network node 210. In some examples, to select a particular beam for communication with a UE 220, the network node 210 may transmit a reference signal, such as an SSB or a CSI-RS, on each of a plurality of beams in a beam-sweeping manner. In some examples, SSBs may be transmitted on wider beams, whereas CSI-RSs may be transmitted on narrower beams. The UE 220 may measure the RSRP or the signal-to-interference-plus-noise ratio (SINR) on each of the beams and transmit a beam measurement report (for example, an L1 measurement report) to the network node 210 indicating the RSRP or SINR associated with each of one or more of the measured beams. The network node 210 may then select the particular beam for communication with the UE 220 based on the L1 measurement report. In some other examples, when there is channel reciprocity between the uplink and the downlink, the network node 210 may derive the particular beam to communicate with the UE 220 (for example, on both the uplink and downlink) based on uplink measurements of one or more uplink reference signals, such as an SRS, transmitted by the UE 220.

One enhancement for multi-beam operation at higher carrier frequencies is facilitation of efficient (for example, low latency and low overhead) downlink and/or uplink beam management operations to support higher Layer 1 and/or Layer 2 (L1/L2)-centric inter-cell mobility. L1 and/or L2 signaling may be referred to as "lower layer" signaling and may be used to activate and/or deactivate candidate cells in a set of cells configured for L1/L2 mobility and/or to provide reference signals for measurement by the UE 220, by which the UE 220 may select a candidate beam as a target beam for a lower layer handover operation. Accordingly, one goal for L1/L2-centric inter-cell mobility is to enable a UE to perform a cell switch via dynamic control signaling at lower layers (for example, DCI for L1 signaling or a medium access control (MAC) control element (MAC-CE) for L2 signaling), rather than semi-static Layer 3 (L3) RRC signaling, in order to reduce latency, reduce overhead, and/or otherwise increase efficiency of the cell switch.

In some examples, for a UE 220, UL transmission may be performed using one antenna panel, and DL reception may be performed using another antenna panel. In some examples, full-duplex communication may be conditional on a beam separation of the UL beam and DL beam at respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 220, and may enable more efficient utilization of resources. Beam separation of the UL and DL beams assists in limiting or reducing self-interference that may occur during full duplex communication. UL and DL beams that are separated on their respective antenna panels may provide reliable full duplex communication by minimizing or reducing self-interference.

A full-duplex UE 220 may perform a self-interference measurement (SIM) procedure to identify self-interference from transmissions of the full-duplex UE 220. A full-duplex network node 210 also may perform a SIM procedure to identify self-interference from transmissions of the full-duplex network node 210. The UE 220 may provide a measurement report to the network node 210 to indicate results of the UE SIM. The network node 210 may select pairs of beams (referred to herein as "beam pairs") for the UE 220 ("UE beam pairs") and the network node 210 ("network node beam pairs") to use during full-duplex communications. A beam pair generally includes a receive (Rx) beam and a transmit (Tx) beam, such as a DL beam and an UL beam, respectively, for the UE 220, and similarly, an UL beam and a DL beam, respectively, for the network node 210.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception on an air interface) and a digital signal (such as for processing by one or more processors of the network node 210). In some aspects, the RF chain may be or may be included in a transceiver of the network node 110.

In some examples, the network node 210 may use the communication unit 244 to communicate with a core network or other network nodes. The communication unit 244 may support wired and/or wireless communication protocols and/or connections such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface such as a network interface.

The UE 220 may include a set of antennas 252 (shown as antennas 252a through 252r, where r≥1), a set of modems 254 (shown as modems 254a through 254r, where r≥1), a MIMO detector, a receive processor 258, a data sink 260, a data source 262, a transmit processor 264, a TX MIMO processor 266, a controller/processor 280, a memory 282, and/or a communication manager 140, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be used by a processor (for example, the controller/processor 280) and the memory 282 to perform aspects of any of the methods described herein. The term "controller/processor" may refer to one or more controllers and/or one or more processors. For example, reference to "a/the processor," "a/the controller/processor," or the like (in the singular) should be understood to refer to any one or more of the processors described in connection with FIG. 2 (e.g., a single processor or a combination of multiple different processors). Similarly, reference to "a/the memory" should be understood to refer to any one or more memories of the corresponding device or node (e.g., a single memory or a combination of multiple different memories). In some aspects, the UE 220 may include another interface, another communication component, and/or another component that facilitates communication with the network node 210 and/or another UE 220.

One or more antennas of the set of antennas 252 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. In some examples, each of the antenna elements of an antenna 234 may include one or more sub-elements for radiating or receiving radio frequency signals. As used herein, "antenna" can refer to one or more antennas, one or more antenna panels, one or more antenna groups, one or more sets of antenna elements, or one or more antenna arrays.

For downlink communication, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to a data sink 260 (such as data a data pipeline, a data queue, or an application executed on the UE 220), and may provide decoded control information and system information to a controller/processor 280.

For uplink communication, the transmit processor 264 may receive and process data ("uplink data") from a data source 262 (such as data a data pipeline, a data queue, or an application executed on the UE 220) and control information from the controller/processor 280. The control information may include one or more parameters, feedback, one or more signal measurements, and/or other types of control information. In some aspects, the receive processor 258 and/or the controller/processor 280 may determine one or more parameters for a received signal (such as received from the network node 210 or another UE), such as a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, and/or another parameter. The control information may facilitate parameter selection and/or scheduling for the UE 220 by the network node 210.

The transmit processor 264 may generate reference symbols for one or more reference signals, such as an uplink DMRS, an uplink SRS, and/or another type of reference signal. The symbols from the transmit processor 264 may be precoded by the TX MIMO processor 266 if applicable, further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, or upconvert) the output sample stream to obtain an uplink signal.

The modems 254a through 254r may transmit a set of uplink signals (for example, R downlink signals) via the corresponding set of antennas 252. An uplink signal may include an uplink control information (UCI) communication, a MAC-CE communication, an RRC communication or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), or a physical sidelink feedback channel (PSFCH).

In some examples, the uplink communication or the downlink communication may include a MIMO communication. "MIMO" generally refers to transmitting and receiving multiple data signals (such as multiple layers or multiple data streams) simultaneously over a radio channel. MIMO may exploit multipath propagation. MIMO may be implemented using spatial processing referred to as precoding, or using spatial multiplexing. In some examples, MIMO may support simultaneous transmission to multiple receivers, referred to as multi-user MIMO (MU-MIMO). Some RATs may employ advanced MIMO techniques, such as multiple TRP operation (including redundant transmission or reception on multiple TRPs), reciprocity in the time domain or the frequency domain, single-frequency-network (SFN) transmission, or non-coherent joint transmission (NC-JT).

Figure 3:
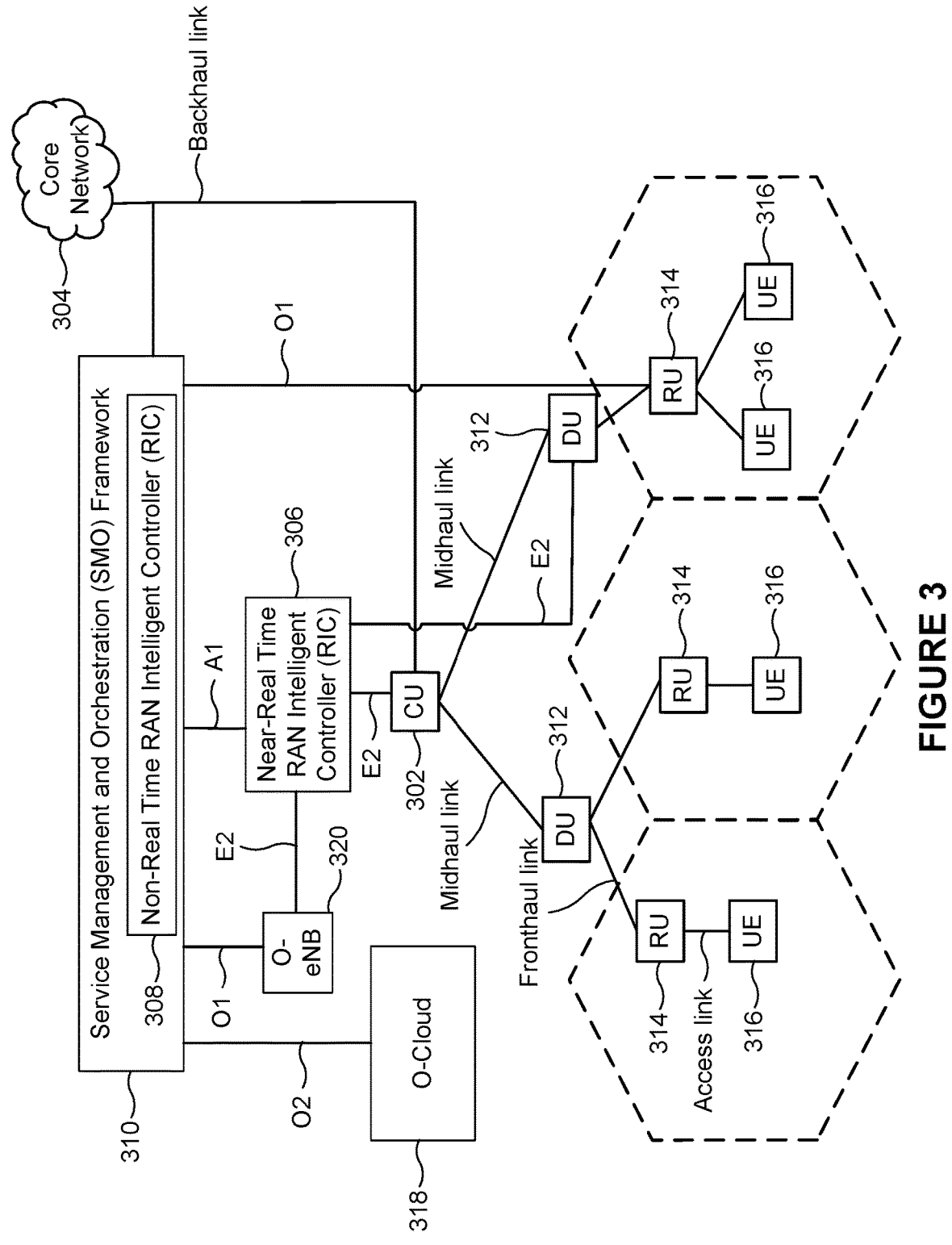
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, include, or be included in, one or more network nodes (such one or more network nodes 110 or one or more network nodes 210). The disaggregated base station architecture 300 may include a CU 302 that can communicate directly with a core network 304 via a backhaul link, or indirectly with the core network 304 through one or more disaggregated control units (such as a Near-RT RIC 306 via an E2 link, or a Non-RT RIC 308 associated with a Service Management and Orchestration (SMO) Framework 310, or both). The CU 302 may communicate with one or more DUs 312 via respective midhaul links, such as through F1 interfaces. Each of the DUs 312 may communicate with one or more RUs 314 via respective fronthaul links. Each of the RUs 314 may communicate with one or more UEs 316 via respective RF access links. In some deployments, a UE 316 may be simultaneously served by multiple RUs 314.

Each of the components of the disaggregated base station architecture 300, including the CUs 302, the DUs 312, the RUs 314, as well as the Near-RT RICs 306, the Non-RT RICs 308, and the SMO Framework 310, may include one or more interfaces or be coupled with one or more interfaces for receiving or transmitting signals, data, or information (collectively, signals) via a wired or wireless transmission medium.

In some aspects, the CU 302 may host one or more higher layer control functions. Such control functions can include radio resource control (RRC) functions, packet data convergence protocol (PDCP) functions, or service data adaptation protocol (SDAP) functions, among other examples. Each control function can be implemented with an interface for communicating signals with other control functions hosted by the CU 302. The CU 302 may handle user plane functionality (for example, Central Unit-User Plane (CU-UP) functionality), and/or control plane functionality (for example, Central Unit-Control Plane (CU-CP) functionality). In some implementations, the CU 302 can be logically split into one or more CU-UP units and one or more CU-CP units. A CU-UP unit can communicate bidirectionally with a CU-CP unit via an interface, such as the E1 interface when implemented in an O-RAN configuration. The CU 302 can be deployed to communicate with one or more DUs 312, as necessary, for network control and signaling.

Each DU 312 may correspond to a logical unit that includes one or more base station functions to control the operation of one or more RUs 314. In some aspects, the DU 312 may host one or more of a radio link control (RLC) layer, a MAC layer, and one or more high physical (PHY) layers depending, at least in part, on a functional split, such as a functional split defined by the 3GPP. In some implementations, the one or more high PHY layers may be implemented by one or more modules for forward error correction (FEC) encoding and decoding, scrambling, and modulation and demodulation, among other examples. In some implementations, the DU 312 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface for communicating signals with other layers (and modules) hosted by the DU 312, or with the control functions hosted by the CU 302.

Each RU 314 may implement lower-layer functionality. In some deployments, an RU 314, controlled by a DU 312, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 314 can be operated to handle over the air (OTA) communication with one or more UEs 316. In some implementations, real-time and non-real-time aspects of control and user plane communication with the RU(s) 314 can be controlled by the corresponding DU 312. In some deployments, this configuration can enable each DU 312 and the CU 302 to be implemented in a cloud-based RAN architecture, such as a vRAN architecture.

The SMO Framework 310 may support RAN deployment and provisioning of non-virtualized and virtualized network elements. For non-virtualized network elements, the SMO Framework 310 may support the deployment of dedicated physical resources for RAN coverage requirements, which may be managed via an operations and maintenance interface (such as an O1 interface). For virtualized network elements, the SMO Framework 310 may interact with a cloud computing platform (such as an open cloud (O-Cloud) platform 318) to perform network element life cycle management (such as to instantiate virtualized network elements) via a cloud computing platform interface (such as an O2 interface). Such virtualized network elements can include, but are not limited to, CUs 302, DUs 312, RUs 314, non-RT RICs 308, and Near-RT RICs 306. In some implementations, the SMO Framework 310 can communicate with a hardware aspect of a 4G RAN, a 5G NR RAN, and/or a 6G RAN, such as an open eNB (O-eNB) 320, via an O1 interface. Additionally, in some implementations, the SMO Framework 310 can communicate directly with each of one or more RUs 314 via a respective O1 interface. The SMO Framework 310 also may include a Non-RT RIC 308 that supports functionality of the SMO Framework 310.

The Non-RT RIC 308 may include or implement a logical function that enables non-real-time control and optimization of RAN elements and resources, Artificial Intelligence/Machine Learning (AI/ML) workflows including model training and updates, or policy-based guidance of applications/features in the Near-RT RIC 306. The Non-RT RIC 308 may be coupled to or communicate with (such as via an A1 interface) the Near-RT RIC 306. The Near-RT RIC 306 may include or implement a logical function that enables near-real-time control and optimization of RAN elements and resources via data collection and actions over an interface (such as via an E2 interface) connecting one or more CUs 302, one or more DUs 312, or both, as well as an O-eNB 320, with the Near-RT RIC 306.

In some implementations, to generate AI/ML models to be deployed in the Near-RT RIC 306, the Non-RT RIC 308 may receive parameters or external enrichment information from external servers. Such information may be utilized by the Near-RT RIC 306 and may be received at the SMO Framework 310 or the Non-RT RIC 308 from non-network data sources or from network functions. In some examples, the Non-RT RIC 308 or the Near-RT RIC 306 may tune RAN behavior or performance. For example, the Non-RT RIC 308 may monitor long-term trends and patterns for performance and employ AI/ML models to perform corrective actions through the SMO Framework 310 (such as reconfiguration via an O1 interface) or via creation of RAN management policies (such as A1 interface policies).

The network node 110, the controller/processor 240 of the network node 210, the UE 120, the controller/processor 280 of the UE 220, the CU 310 of FIG. 3, the DU 330 of FIG. 3, the RU 340 of FIG. 3, or any other component(s) of FIG. 1, 2, or 3 may implement one or more techniques or perform one or more operations associated with UE DRX timing in association with a cell DTX configuration and/or a cell DRX configuration, as described in more detail elsewhere herein. For example, the controller/processor 240 of the network node 210, the controller/processor 280 of the UE 220, or any other component(s) of FIG. 2 may perform or direct operations of, for example, process 1000 of FIG. 10, process 1100 of FIG. 11, or other processes as described herein. The memory 242 and the memory 282 may store data and program codes for the network node 110/210 and the UE 120/220, respectively. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types).

The memory 282 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 310 of FIG. 3, the DU 330 of FIG. 3, or the RU 340 of FIG. 3, may cause the one or more processors to perform process 1000 of FIG. 10, process 1100 of FIG. 11, or other processes as described herein, or other processes as described herein. In some examples, executing instructions may include running the instructions, converting the instructions, compiling the instructions, or interpreting the instructions, among other examples. As used herein, "processor," "controller," or "controller/processor" can refer to a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

In some aspects, a UE (e.g., the UE 220) includes means for receiving first configuration information indicative of a UE DRX configuration; means for receiving second configuration information indicative of a cell DTX configuration associated with a cell DTX cycle of a serving cell and/or a cell DRX configuration associated with a cell DRX cycle of the serving cell; means for modifying, in association with at least one of the cell DTX cycle or the cell DRX cycle, at least one UE DRX timer associated with an activity state of a UE DRX cycle associated with the UE DRX configuration; and/or means for monitoring, in association with modifying the at least one UE DRX timer, a PDCCH during a UE active time.

In some aspects, the UE includes means for receiving first configuration information indicative of a UE DRX configuration associated with a UE DRX cycle; means for receiving second configuration information indicative of a cell DTX configuration associated with a cell DTX cycle of a serving cell and/or a cell DRX configuration associated with a cell DRX cycle of the serving cell; means for transmitting an uplink signal during a cell DTX active time associated with the DTX cycle; means for transmitting a scheduling request (SR) associated with a retransmission of the uplink signal; means for starting a UE DRX active time in association with transmitting the SR; and/or means for monitoring, in association with starting the UE DRX active time, a physical downlink control channel (PDCCH). The means for the user equipment (UE) to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
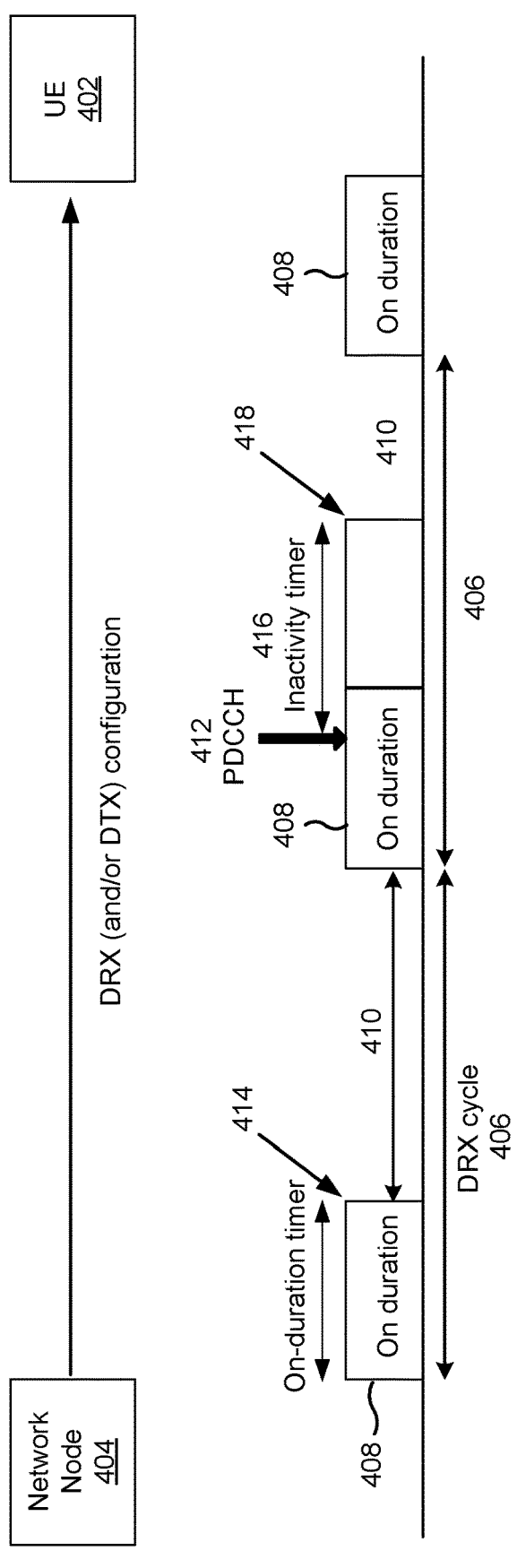
FIG. 4 is a diagram illustrating an example of a UE discontinuous reception (DRX) configuration, in accordance with the present disclosure.

FIG. 4 is a diagram illustrating an example 400 of a UE DRX configuration, in accordance with the present disclosure. As shown, a UE 402 and a network node 404 may communicate with one another. The UE 402 may be, be similar to, include, or be included in, the UE 316 depicted in FIG. 3, the UE 220 depicted in FIG. 2, and/or the UE 120 depicted in FIG. 1. The network node 404 may be, be similar to, include, or be included in, one or more components of the disaggregated base station architecture depicted in FIG. 3, the network node 210 depicted in FIG. 2, and/or the network node 110 depicted in FIG. 1.

As shown in FIG. 4, a network node 404 may transmit a UE DRX configuration to a UE 402 to configure a UE DRX cycle 406 for the UE 402. A UE DRX cycle 406 may include a UE DRX on duration 408 (e.g., during which a UE 402 is awake or in an active state) and an opportunity to enter a UE DRX sleep state 410. As used herein, the time during which the UE 402 is configured to be in an active state during the UE DRX on duration 408 may be referred to as an active time, and the time during which the UE 402 is configured to be in the UE DRX sleep state 410 may be referred to as an inactive time. As described below, the UE 402 may monitor a PDCCH during the active time, and may refrain from monitoring the PDCCH during the inactive time.

During the UE DRX on duration 408 (e.g., the active time), the UE 402 may monitor a downlink control channel (e.g., a PDCCH), in operation 412. For example, the UE 402 may monitor the PDCCH for downlink control information (DCI) pertaining to the UE 402. If the UE 402 does not detect and/or successfully decode any PDCCH communications intended for the UE 402 during the UE DRX on duration 408, then the UE 402 may enter the sleep state 410 (e.g., for the inactive time) at the end of the UE DRX on duration 408, in operation 414. In this way, the UE 402 may conserve battery power and reduce power consumption. As shown, the UE DRX cycle 406 may repeat with a configured periodicity according to the UE DRX configuration.

If the UE 402 detects and/or successfully decodes a PDCCH communication intended for the UE 402, then the UE 402 may remain in an active state (e.g., awake) for the duration of a UE DRX inactivity timer 416 (e.g., which may extend the active time).

The UE 402 may start the DRX inactivity timer 416 at a time at which the PDCCH communication is received (e.g., in a transmission time interval (TTI) in which the PDCCH communication is received, such as a slot or a subframe). The UE 402 may remain in the active state until the UE DRX inactivity timer 416 expires, at which time the UE 402 may enter the sleep state 415 (e.g., for the inactive time), in an operation 418. During the duration of the UE DRX inactivity timer 416, the UE 402 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 402 may restart the UE DRX inactivity timer 416 after each detection of a PDCCH communication for the UE 402 for an initial transmission (e.g., but not for a retransmission). By operating in this manner, the UE 402 may conserve battery power and reduce power consumption by entering the sleep state 410.

In some cases, the network node 404 may transmit a UE DTX configuration to the UE 402 to configure a UE DTX cycle for the UE 402. The UE DTX configuration may be similar (or identical) to the UE DRX configuration described herein. For example, the UE 402 may be configured to transmit to the network node 110 during a UE DTX active period (e.g., a UE DTX on duration) and may be configured to refrain from transmitting to network node 404 during a UE DTX inactive period (e.g., a UE DTX sleep duration). In some cases, the UE DRX configuration and the UE DTX configuration may have the same active duration and/or the same inactive duration. For example, the UE DRX configuration may be a combined UE DRX and UE DTX configuration. In some other cases, the UE DRX configuration and the UE DTX configuration may have different active durations and/or different inactive durations.

The UE DRX and UE DTX configuration for the UE 402 may enable the UE 402 to conserve battery power and to reduce power consumption by entering a sleep state when the UE 402 is not communicating with the network node 404. In some cases, the network node 404 may not be configured with a DRX or DTX configuration. For example, the network node 404 may be in an active state for an extended period of time, such as an indefinite period of time.

Figure 5:
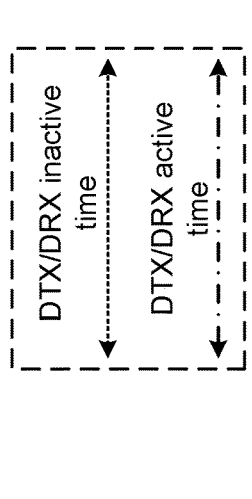
FIG. 5 is a diagram illustrating an example of a cell discontinuous transmission (DTX) and/or cell DRX cycle occurring in conjunction with a UE DRX cycle, in accordance with the present disclosure.

FIG. 5 is a diagram illustrating an example 500 of a cell DTX and/or cell DRX cycle occurring in conjunction with a UE DRX cycle, in accordance with the present disclosure. The UE 502 may be, be similar to, include, or be included in, the UE 402 depicted in FIG. 4, the UE 316 depicted in FIG. 3, the UE 220 depicted in FIG. 2, and/or the UE 120 depicted in FIG. 1. The network node 504 may be, be similar to, include, or be included in, the network node 404 depicted in FIG. 4, one or more components of the disaggregated base station architecture depicted in FIG. 3, the network node 210 depicted in FIG. 2, and/or the network node 110 depicted in FIG. 1. In some examples, the UE 402 may be in a connected state (e.g., an RRC connected state) with the network node 404. The UE 402 may operate in a UE DRX mode, as described herein.

In some cases, the network node 504 may be configured with a cell-specific DTX ("cell DTX") configuration and/or a cell-specific DRX ("cell DRX") configuration. In some cases, the UE DTX and/or DRX configuration may be configured so that a UE DTX and/or a UE DRX cycle is synchronized with a cell DTX cycle and/or a cell DRX cycle. In some cases, the network node 504 may operate in accordance with a cell DRX or cell DTX configuration that does not align with a connected mode UE DRX or UE DTX configuration of the UE 502. For example, a cell DRX or cell DTX cycle of the network node 504 may be in an active state while the connected mode UE DRX or UE DTX configuration of the UE 502 is in an inactive state. This may result in wasted energy and processing resources by the network node 504 and/or the UE 502.

As shown, for example, the UE 502 may operate in a DRX mode with DRX active times that do not necessarily synchronize with cell DTX active times. Accordingly, a cell DTX non-active time can start during a UE DRX active time, leaving a period of time 506 during which the UE 502 may attempt to transmit to the non-active network node 504 and/or may monitor a downlink channel for communications from the non-active network node 504. In some cases, as shown, a cell DTX cycle can be longer than the UE DRX cycle, resulting in the UE 502 entering a UE DRX active time during a cell DTX and/or DRX non-active time, thereby resulting in a waste of energy resources at the UE 502.

Additionally, or alternatively, as shown, the UE 502 can transmit an uplink communication ("UL Tx") 508 during the cell DTX active time and subsequently transmit a scheduling request (SR) 510, for retransmission resources, during the cell DTX non-active time. However, the network node 504 may then transition to a cell DTX non-active time, in which case the network node 504 may not transmit a PDCCH 512 communication granting retransmission resources until the next cell DTX active time, which can result in the UE 502 having to maintain the data for retransmission during an intervening UE DRX active time and/or may result in too much of a delay for the network node 504 to efficiently process the retransmission.

Various aspects relate generally to UE DRX timing in association with a cell DTX configuration and/or a cell DRX configuration ("cell DTX/DRX configuration"). Some aspects more specifically relate to modifying one or more UE DRX timers in association with a cell DTX cycle and/or a cell DRX cycle ("cell DTX/DRX cycle"). For example, in some aspects, a UE may modify UE DRX timers to maintain a number of activity states in association with the cell DTX/DRX configuration. For example, the UE may maintain a UE active time, a UE DRX inactive time, a cell DTX non-active time, a cell DRX non-active time, and/or a cell DTX/DRX non-active time in association with the cell DTX/DRX configuration. As another example, in some aspects, the UE may allow only a cell DTX configuration by a special cell (SpCell) to affect a UE active time. As another example, the cell DTX/DRX configuration may be configured by cell group. As another example, the UE may stop a UE DRX on duration timer and/or a UE inactivity timer for each DRX group in association with the corresponding cell DTX active time starting during a UE DRX active time. As another example, a UE may refrain from starting a UE DRX active time if an SR is sent during a cell DTX non-active time. As another example, a dedicated activation communication may be used to activate an aperiodic one-time cell active period for receiving a PDCCH scheduling retransmission resources in association with an SR transmitted during a cell DTX non-active time. In some examples, the dedicated activation communication may be used to activate a cell active period for multiple cycles or until a deactivation communication is received.

Particular aspects of the subject matter described in this disclosure can be implemented to realize one or more of the following potential advantages. In some examples, the described techniques can be used to enable a network node to achieve energy savings by entering a sleep state while minimizing an impact on particular functions associated with UEs. For example, the described techniques may increase opportunities to enter into a sleep state while still allowing for synchronization between a cell DTX active time and a UE DRX active time. As another example, UE DRX timer modifications may enable a UE to receive scheduled retransmission resources shortly after transmitting an SR during a cell DTX non-active time. In this way, the described techniques may be used to enable further network energy savings without unnecessarily degrading UE connectivity and reliability or unnecessarily increasing power consumption.

Figure 6:
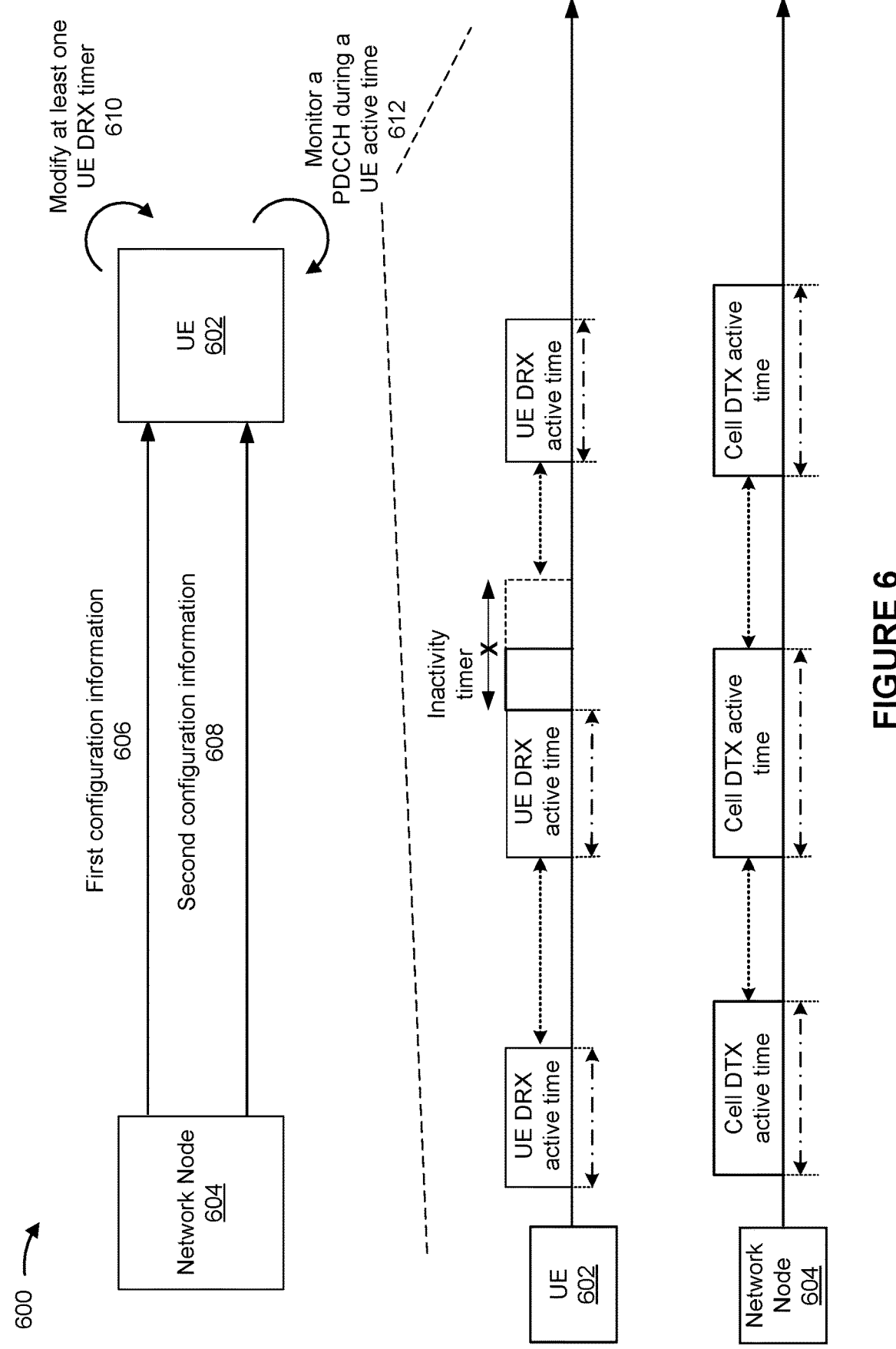
FIG. 6 is a diagram illustrating an example associated with UE DRX timing in association with a cell DTX configuration, in accordance with the present disclosure.

FIG. 6 is a diagram illustrating an example 600 associated with UE DRX timing in association with a cell DTX configuration, in accordance with the present disclosure. As shown, a UE 602 and a network node 604 may communicate with one another. The UE 602 may be, be similar to, include, or be included in, the UE 502 depicted in FIG. 5, the UE 402 depicted in FIG. 4, the UE 316 depicted in FIG. 3, the UE 220 depicted in FIG. 2, and/or the UE 120 depicted in FIG. 1. The network node 604 may be, be similar to, include, or be included in, the network node 504 depicted in FIG. 5, the network node 404 depicted in FIG. 4, one or more components of the disaggregated base station architecture depicted in FIG. 3, the network node 210 depicted in FIG. 2, and/or the network node 110 depicted in FIG. 1.

In a first operation 606, the network node 604 may transmit, and the UE 602 may receive, first configuration information. The first configuration information may be indicative of a UE DRX configuration. The UE DRX configuration may be associated with a UE DRX cycle. In a second operation 608, the network node 604 may transmit, and the UE 602 may receive, second configuration information.

In some cases, the UE DRX cycle may be associated with a medium access control (MAC) entity, which means that a single UE DRX configuration may apply across all serving cells within one cell group. However, each cell DRX configuration and/or cell DTX configuration applies to a single serving cell, which may result in asynchronization between UE DRX cycles and cell DTX cycles. In some aspects, carrier aggregation may not be implemented in cases in which a cell has a cell DTX/DRX configuration, thereby mitigating the asynchronization. In some other aspects, downlink restrictions may be decoupled from the UE DRX configuration (e.g., resulting in the UE MAC layer being in inactive time at different times for different cells).

In some aspects, the UE DRX configuration may be associated with a first UE DRX cell group and a second UE DRX cell group, and the cell DTX configuration is associated with the first UE DRX cell group. In some aspects, therefore, the second configuration information may be indicative of a cell DTX configuration associated with a cell DTX cycle of a serving cell and/or a cell DRX configuration associated with a cell DRX cycle of the serving cell.

Similarly, the network node 604 may transmit, and the UE 602 may receive, third configuration information indicative of at least one of an additional cell DTX configuration or a cell DRX configuration, where the at least one of the additional cell DTX configuration or the cell DRX configuration is associated with the second UE DRX cell group. For example, in some aspects, the cell DTX configuration and/or the cell DRX configuration may be configured by cell group such that the cell DTX configuration and/or the cell DRX configuration can only be assigned to one of two groups aligned with a UE DRX group. In some aspects, only a cell DTX configuration associated with an SpCell can affect the UE DRX timer.

In a third operation 610, the UE 602 may modify at least one UE DRX timer. The at least one UE DRX timer may be associated with an activity state of the UE DRX cycle. In some aspects, the UE 602 may modify the at least one UE DRX timer in association with at least one of the cell DTX cycle or the cell DRX cycle. In a fourth operation 612, the UE 602 may monitor at least one PDCCH during a UE active time. For example, the UE 602 may monitor the at last one PDCCH in association with modifying the at least one UE DRX timer. In some aspects, modifying the at least one UE DRX timer may include changing a time value associated with a UE DRX timer, starting a UE DRX timer, stopping a UE DRX timer, and/or associating a UE DRX timer with a different event, time period, and/or behavior, among other examples. In some aspects, the UE 602 may modify the at least one DRX timer in association with the serving cell being an SpCell.

In some aspects, as shown in FIG. 6, a cell DTX active time may start during a UE DRX active time. The UE 602 may stop a UE DRX on duration timer for each DRX cell group. In some aspects, as shown, the UE 602 may stop a UE DRX inactivity timer for each DRX cell group. For example, the at least one UE DRX timer may include a first UE DRX on duration timer associated with a first UE DRX cell group and a second UE DRX on duration timer associated with a second UE DRX cell group. In some aspects, the UE 602 may stop, in association with the start time of the cell DTX active time associated with the cell DTX cycle occurring during the UE active time, the first UE DRX on duration timer and the second UE DRX on duration timer. In some aspects, the at least one UE DRX timer may include a first UE DRX inactivity timer associated with the first UE DRX cell group and a second UE DRX inactivity timer associated with the second UE DRX cell group, and the UE 602 may stop, in association with the start time of the cell DTX active time associated with the cell DTX cycle occurring during the UE active time, the first UE DRX inactivity timer and the second UE DRX inactivity timer.

In some aspects, after stopping the timers, the UE 602 may enter a long DRX cycle. For example, the UE 602 may transition, in association with stopping the first UE DRX inactivity timer and the second UE DRX inactivity timer, to a long DRX cycle. In some aspects, the long DRX cycle may be a default DRX cycle so that, the UE 602 may enter a short cycle if configured to do so, but otherwise a long DRX cycle. For example, in some aspects, the UE 602 may transition, in association with the first configuration information and further in association with stopping the first UE DRX inactivity timer and the second UE DRX inactivity timer, to a short DRX cycle.

Figure 7:
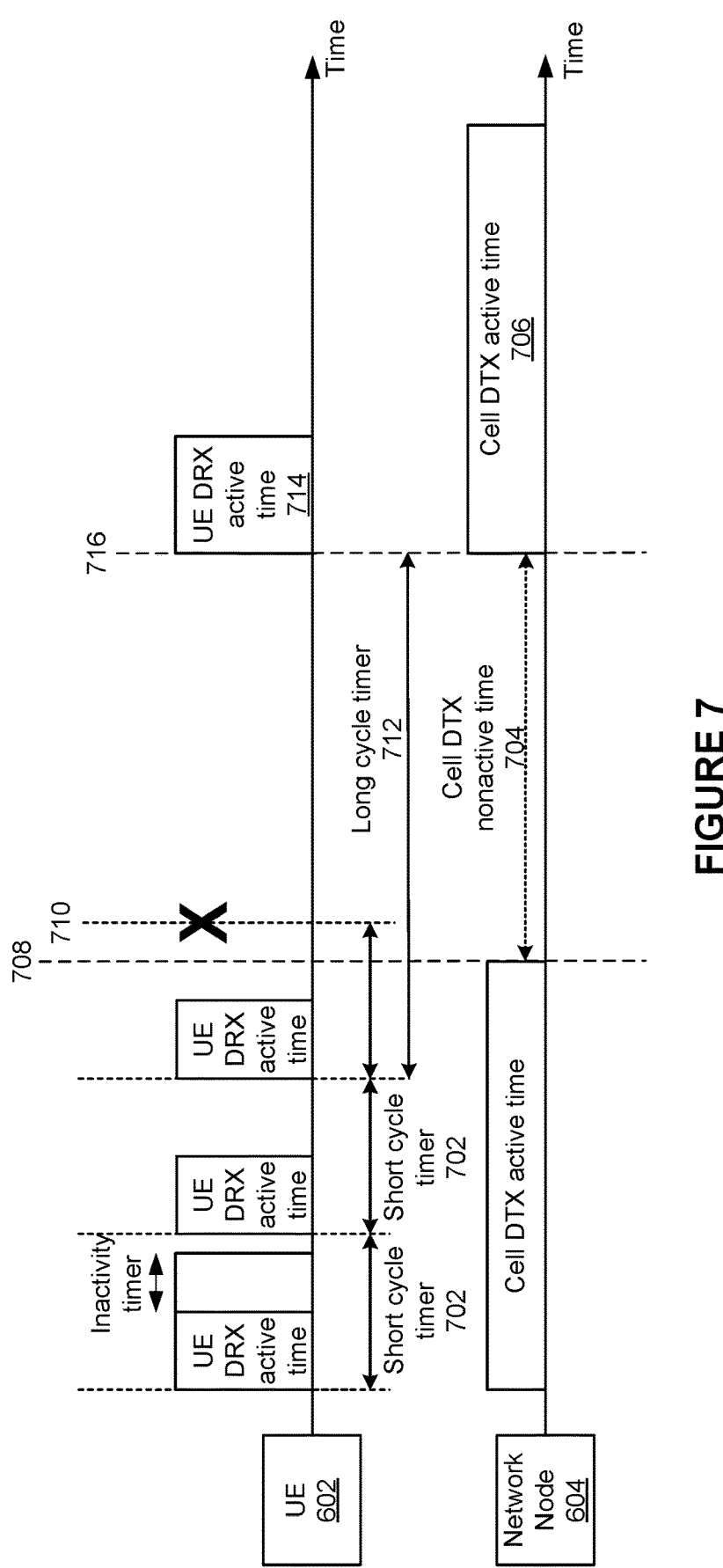
FIG. 7 is a diagram illustrating another example associated with UE DRX timing in association with a cell DTX configuration, in accordance with the present disclosure.

FIG. 7 is a diagram illustrating another example 700 associated with UE DRX timing in association with a cell DTX configuration, in accordance with the present disclosure. As shown in example 700, the UE 602 may be operating in accordance with a short DRX cycle. For example, the at least one UE DRX timer may include a UE DRX short cycle timer 702 associated with the short DRX cycle. In some aspects, if a cell DTX nonactive period 704 starts when the UE DRX short cycle timer 702 is running, the UE 602 may stop the short cycle and enter a long DRX cycle until the next cell DTX active time 706. For example, in some aspects, the UE 602 may stop, in association with a start time 708 of a cell DTX non-active time 704 associated with the cell DTX cycle occurring prior to an expiration 710 of the UE DRX short cycle timer 702, the UE DRX short cycle timer 702. The UE 602 may transition, in association with stopping the UE DRX short cycle timer 702, to a long DRX cycle, associated with a long cycle timer 712. The next active time 714 associated with the UE DRX cycle may have a start time 716 associated with a start time of the next cell DTX active time 706.

In some aspects, the UE 602 may modify a hybrid automatic repeat request (HARQ) timer in association with a cell DTX/DRX cycle. For example, the at least one UE DRX timer modified by the UE 602 may include at least one of a UE DRX HARQ round trip (RTT) timer or a UE DRX retransmission timer.

Figure 8:
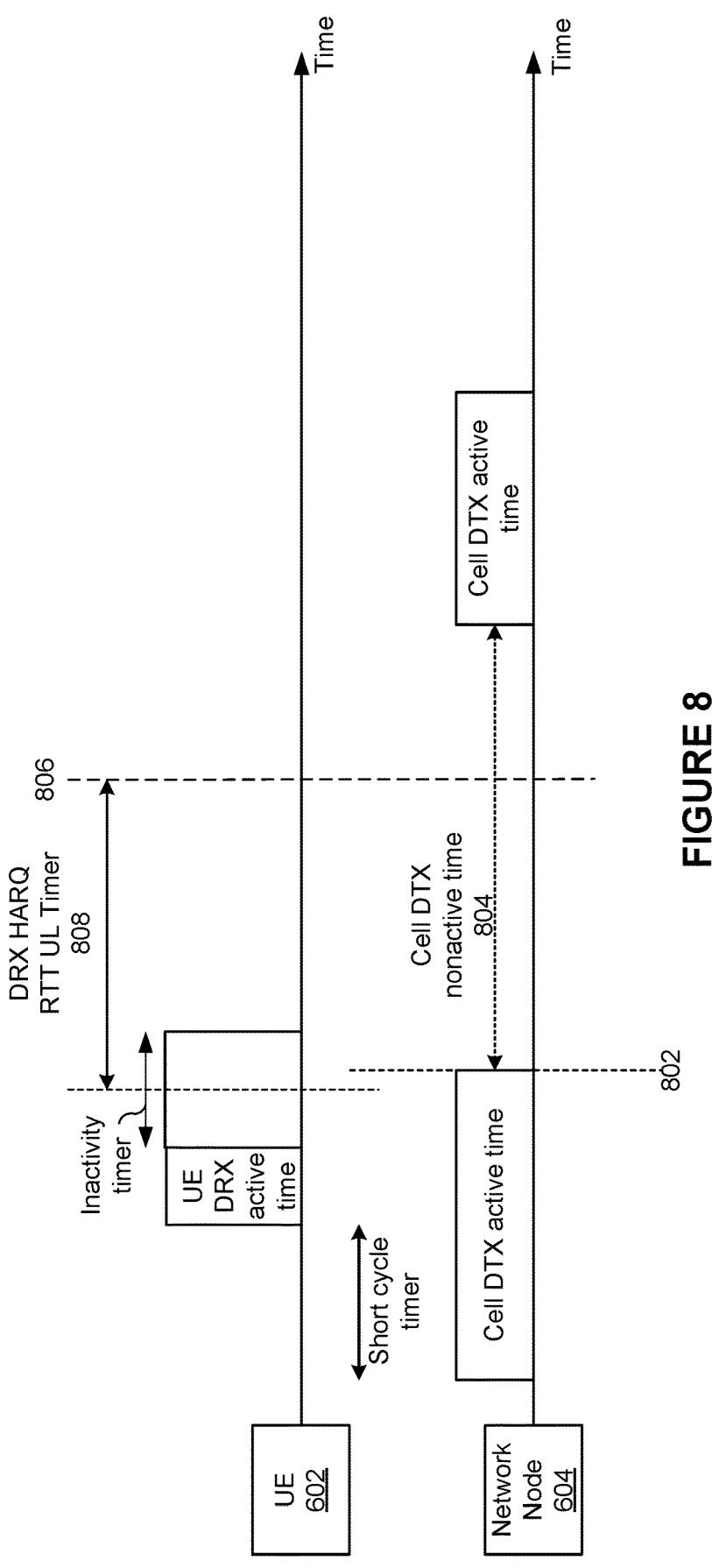
FIG. 8 is a diagram illustrating another example associated with UE DRX timing in association with a cell DTX configuration, in accordance with the present disclosure.

FIG. 8 is a diagram illustrating another example 800 associated with UE DRX timing in association with a cell DTX configuration, in accordance with the present disclosure. As shown in example 800, the UE 602 may be operating in accordance with a short DRX cycle. If the UE DRX HARQ RTT timer and/or the UE DRX retransmission timer is running during a cell DTX non-active time, the UE 602 may stop the UE DRX HARQ RTT timer and refrain from starting the UE DRX retransmission timer. In this way, the UE 602 may not attempt to receive a transmitted downlink HARQ communication during a cell DTX nonactive time. In some aspects, the UE 602 may not start the UE DRX HARQ RTT timer if an uplink transmission occurs during a cell nonactive time. In some aspects, the UE 602 may stop the UE DRX retransmission timer if it is already running. In this case, the network node 604 may schedule the retransmission using a PDCCH during a next cell DTX active time.

For example, in some aspects, the UE 602 may stop, in association with a start time 802 of a cell DTX non-active time 804 of the cell DTX cycle occurring prior to an expiration 806 of the UE DRX HARQ RTT timer 808, the UE DRX HARQ RTT timer 808 at the start time 802 of the cell DTX non-active time 804. In some aspects, the UE 602 may refrain, in association with the start time 802 of the cell DTX non-active time 804 of the cell DTX cycle occurring prior to the expiration 806 of the ULE DRX HARQ RTT timer 808, from starting the UE DRX retransmission timer. In some aspects, the UE 602 may transmit an uplink signal during the cell DTX non-active time 804 associated with at least one of the cell DTX cycle or the cell DRX cycle, and may refrain from starting, in association with transmitting the uplink signal during the cell DTX non-active time 804, the UE DRX HARQ RTT timer. In some aspects, the UE 602 may stop, in association with the start time 802 of the cell DTX non-active time 804 of the cell DTX cycle occurring prior to the expiration 806 of the UE DRX HARQ RTT timer 808, the UE DRX retransmission timer at the start time 802 of the cell DTX non-active time 804. In some aspects, the UE DRX HARQ RTT timer 808 may include a UE DRX HARQ RTT uplink timer or a UE DRX HARQ RTT downlink timer, and the UE DRX retransmission timer may include a UE DRX retransmission uplink timer or a UE DRX retransmission downlink timer.

Some aspects may facilitate avoiding HARQ buffer overwrite during a cell DTX non-active period. For example, if a dynamic grant shares a HARQ identifier (ID) with a configured grant (CG), the CG can overwrite the HARQ buffer as long as the CG timer is not running. In some aspects, for example, the UE 602 may set a value of a cell DTX transmission flag associated with a downlink HARQ process. The value of the cell DTX transmission flag may include a first value (e.g., 0) or a second value (e.g., 1). In some aspects, the first value may be associated with an availability of the downlink HARQ process (e.g., the HARQ buffer) for a new MAC protocol data unit (PDU) during a cell DTX non-active time of the cell DTX cycle. The second value may be associated with an unavailability of the downlink HARQ process for the new MAC PDU. In some aspects, the second value may be associated with an availability of the HARQ process for logical channel prioritization (LCP) data having a priority higher than a priority of the new MAC PDU.

In some aspects, for example, the UE 602 may transmit an uplink signal during a cell DTX non-active time associated with the cell DTX cycle, and may set the value to the second value in association with transmitting the uplink signal during the cell DTX non-active time. In some aspects, the UE 602 may set the value to the second value in association with a start time of a cell DTX non-active time occurring prior to an expiration of a UE DRX HARQ RTT timer. In some aspects, the UE 602 may set the value to the second value in association with a start time of a cell DTX non-active time occurring prior to an expiration of a UE DRX retransmission timer. In some aspects, the UE 602 may set the value to the first value in association with a start of a cell DTX active time associated with the cell DTX cycle.

Figure 9:
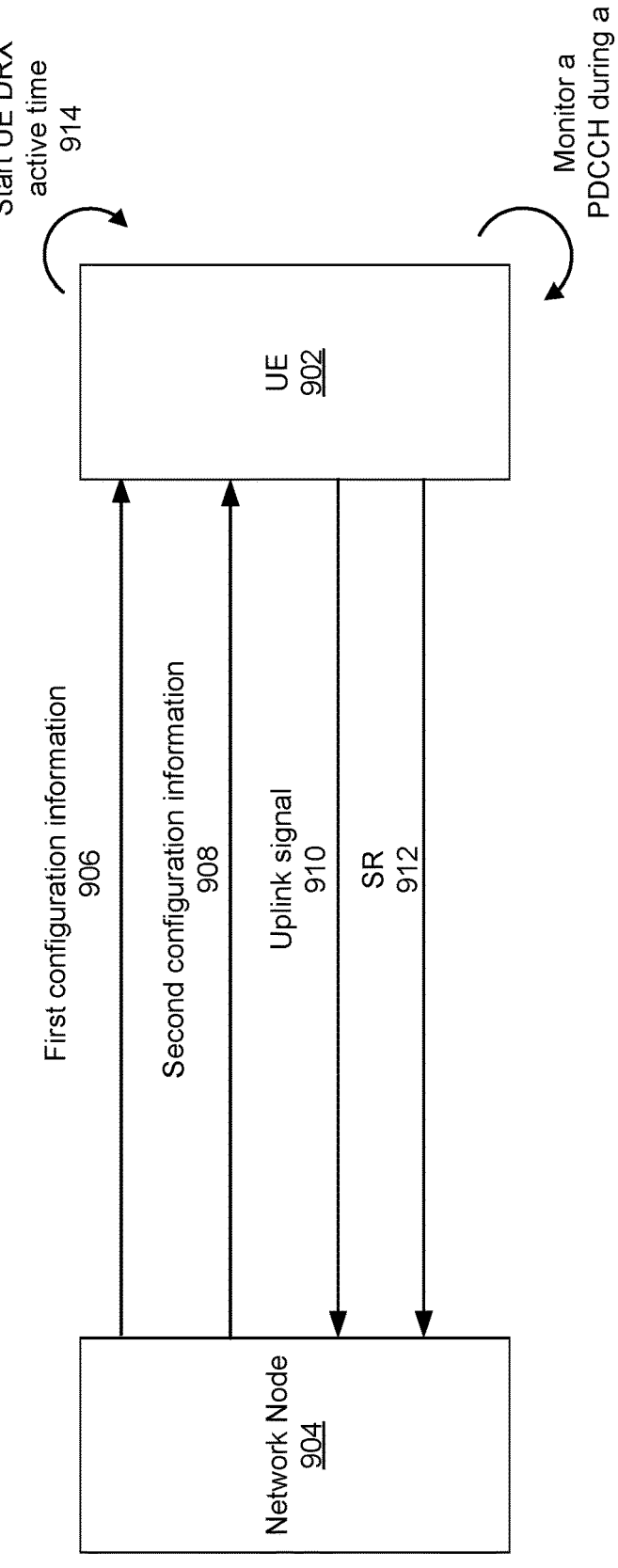
FIG. 9 is a diagram illustrating another example associated with UE DRX timing in association with a cell DTX configuration, in accordance with the present disclosure.

FIG. 9 is a diagram illustrating another example 900 associated with UE DRX timing in association with a cell DTX configuration, in accordance with the present disclosure. As shown, a UE 902 and a network node 904 may communicate with one another. The UE 902 may be, be similar to, include, or be included in, the UE 602 depicted in FIGS. 6-8, the UE 502 depicted in FIG. 5, the UE 402 depicted in FIG. 4, the UE 316 depicted in FIG. 3, the UE 220 depicted in FIG. 2, and/or the UE 120 depicted in FIG. 1. The network node 904 may be, be similar to, include, or be included in, the network node 604 depicted in FIGS. 6-8, the network node 504 depicted in FIG. 5, the network node 404 depicted in FIG. 4, one or more components of the disaggregated base station architecture depicted in FIG. 3, the network node 210 depicted in FIG. 2, and/or the network node 110 depicted in FIG. 1.

In a first operation 906, the network node 904 may transmit, and the UE 902 may receive, first configuration information. The first configuration information may be indicative of a UE DRX configuration. The UE DRX configuration may be associated with a UE DRX cycle. In a second operation 908, the network node 904 may transmit, and the UE 902 may receive, second configuration information. The second configuration information may be indicative of a cell DTX configuration associated with a cell DTX cycle of a serving cell and/or a cell DRX configuration associated with a cell DRX cycle of the serving cell.

In a third operation 910, the UE 902 may transmit, and the network node 904 may receive, an uplink signal. The uplink signal may be transmitted during a cell DTX active time associated with the DTX cycle. In a fourth operation 912, the UE 902 may transmit, and the network node 904 may receive, an SR. The SR may be associated with a retransmission of the uplink signal.

In a fifth operation 914, the UE 902 may start a UE DRX active time. For example, the UE 902 may start the UE DRX active time in association with transmitting the SR. In some aspects, the UE 902 may start the UE DRX active time in association with a transmission time associated with transmitting the SR occurring during the DTX active time. In some aspects, the UE 902 may start the UE DRX active time in association with transmitting the SR. In some aspects, the network node 904 may transmit, and the UE 902 may receive, an activation communication, and the UE 902 may start the UE DRX active time in association with receiving the activation communication. In some aspects, the UE 902 may start the UE DRX active time in association with an occurrence of an expiration of a cell DTX non-active time associated with the cell DTX cycle. In some aspects, the UE 902 may transmit the SR in a PUCCH occasion prior to a start of a DTX non-active time, and the UE 902 may start the UE DRX active time in association with a specified quantity of PDCCH occasions occurring between a time associated with the PUCCH occasion and a start time of the DTX non-active time. In some aspects, the second configuration information may indicate the specified quantity of PDCCH occasions.

In a fifth operation 916, the UE 902 may monitor a PDCCH. For example, the UE 902 may monitor the PDCCH in association with starting the UE DRX active time.

FIG. 10 is a flowchart illustrating an example process 1000 performed, for example, by a UE that supports DRX configurations in accordance with the present disclosure. Example process 1000 is an example where the UE (for example, UE 120) performs operations associated with UE DRX timing in association with a cell DTX configuration and/or a cell DRX configuration.

As shown in FIG. 10, in some aspects, process 1000 may include receiving first configuration information indicative of a UE DRX configuration (block 1010). For example, the UE (such as by using communication manager 1208 or reception component 1202, depicted in FIG. 12) may receive first configuration information indicative of a UE DRX configuration, as described above.

As further shown in FIG. 10, in some aspects, process 1000 may include receiving second configuration information indicative of a cell DTX configuration associated with a cell DTX cycle of a serving cell and/or a cell DRX configuration associated with a cell DRX cycle of the serving cell (block 1020). For example, the UE (such as by using communication manager 1208 or reception component 1202, depicted in FIG. 12) may receive second configuration information indicative of a cell DTX configuration associated with a cell DTX cycle of a serving cell and/or a cell DRX configuration associated with a cell DRX cycle of the serving cell, as described above.

As further shown in FIG. 10, in some aspects, process 1000 may include modifying, in association with at least one of the cell DTX cycle or the cell DRX cycle, at least one UE DRX timer associated with an activity state of a UE DRX cycle associated with the UE DRX configuration (block 1030). For example, the UE (such as by using communication manager 1208, depicted in FIG. 12) may modify, in association with at least one of the cell DTX cycle or the cell DRX cycle, at least one UE DRX timer associated with an activity state of a UE DRX cycle associated with the UE DRX configuration, as described above.

As further shown in FIG. 10, in some aspects, process 1000 may include monitoring, in association with modifying the at least one UE DRX timer, a PDCCH during a UE active time (block 1040). For example, the UE (such as by using communication manager 1208 or reception component 1202, depicted in FIG. 12) may monitor, in association with modifying the at least one UE DRX timer, a PDCCH during a UE active time, as described above.

Process 1000 may include additional aspects, such as any single aspect or any combination of aspects described below or in connection with one or more other processes described elsewhere herein.

In a first additional aspect, modifying the at least one UE DRX timer comprises modifying the at least one UE DRX timer in association with the serving cell being a special cell. In a second additional aspect, alone or in combination with the first aspect, the UE DRX configuration is associated with a first UE DRX cell group and a second UE DRX cell group, and wherein the cell DTX configuration is associated with the first UE DRX cell group. In a third additional aspect, alone or in combination with the second aspect, process 1000 includes receiving third configuration information indicative of at least one of an additional cell DTX configuration or a cell DRX configuration, wherein the at least one of the additional cell DTX configuration or the cell DRX configuration is associated with the second UE DRX cell group.

In a fourth additional aspect, alone or in combination with one or more of the second through third aspects, the at least one UE DRX timer comprises a first UE DRX on duration timer associated with the first UE DRX cell group and a second UE DRX on duration timer associated with the second UE DRX cell group, the method further comprising stopping, in association with a start time of a cell DTX active time associated with the cell DTX cycle occurring during the UE active time, the first UE DRX on duration timer and the second UE DRX on duration timer. In a fifth additional aspect, alone or in combination with one or more of the second through fourth aspects, the at least one UE DRX timer comprises a first UE DRX inactivity timer associated with the first UE DRX cell group and a second UE DRX inactivity timer associated with the second UE DRX cell group, the method further comprising stopping, in association with a start time of a cell DTX active time associated with the cell DTX cycle occurring during the UE active time, the first UE DRX inactivity timer and the second UE DRX inactivity timer In a sixth additional aspect, alone or in combination with the fifth aspect, process 1000 includes transitioning the UE, in association with stopping the first UE DRX inactivity timer and the second UE DRX inactivity timer, to a long DRX cycle. In a seventh additional aspect, alone or in combination with the sixth aspect, the long DRX cycle comprises a default DRX cycle. In an eighth additional aspect, alone or in combination with one or more of the fifth through seventh aspects, process 1000 includes transitioning the UE, in association with the first configuration information and further in association with stopping the first UE DRX inactivity timer and the second UE DRX inactivity timer, to a short DRX cycle. In a ninth additional aspect, alone or in combination with the eighth aspect, the at least one UE DRX timer comprises a UE DRX short cycle timer associated with the short DRX cycle, the method further comprising stopping, in association with a start time of a cell DTX non-active time associated with the cell DTX cycle occurring prior to an expiration of the UE DRX short cycle timer, the UE DRX short cycle timer, and transitioning the UE, in association with stopping the UE DRX short cycle timer, to a long DRX cycle. In a tenth additional aspect, alone or in combination with the ninth aspect, a next active time associated with the UE DRX cycle has a start time associated with a start time of a next cell DTX active time.

In an eleventh additional aspect, alone or in combination with one or more of the first through tenth aspects, the at least one UE DRX timer comprises at least one of a UE DRX HARQ RTT timer or a UE DRX retransmission timer. In a twelfth additional aspect, alone or in combination with the eleventh aspect, process 1000 includes stopping, in association with a start time of a cell DTX non-active time of the cell DTX cycle occurring prior to an expiration of the UE DRX HARQ RTT timer, the UE DRX HARQ RTT timer at the start time of the cell DTX non-active time. In a thirteenth additional aspect, alone or in combination with the twelfth aspect, process 1000 includes refraining, in association with a start time of a cell DTX non-active time of the cell DTX cycle occurring prior to an expiration of the UE DRX HARQ RTT timer, from starting the UE DRX retransmission timer.

In a fourteenth additional aspect, alone or in combination with one or more of the eleventh through thirteenth aspects, process 1000 includes transmitting an uplink signal during a cell DTX non-active time associated with at least one of the cell DTX cycle or the cell DRX cycle, and refraining from starting, in association with transmitting the uplink signal during the cell DTX non-active time, the UE DRX HARQ RTT timer. In a fifteenth additional aspect, alone or in combination with one or more of the eleventh through fourteenth aspects, process 1000 includes stopping, in association with a start time of a cell DTX non-active time of the cell DTX cycle occurring prior to an expiration of the UE DRX HARQ RTT timer, the UE DRX retransmission timer at the start time of the cell DTX non-active time. In a sixteenth additional aspect, alone or in combination with one or more of the eleventh through fifteenth aspects, the UE DRX HARQ RTT timer comprises a UE DRX HARQ RTT uplink timer or a UE DRX HARQ RTT downlink timer. In a seventeenth additional aspect, alone or in combination with one or more of the eleventh through sixteenth aspects, the UE DRX retransmission timer comprises a UE DRX retransmission uplink timer or a UE DRX retransmission downlink timer.

In an eighteenth additional aspect, alone or in combination with one or more of the first through seventeenth aspects, process 1000 includes setting a value of a cell DTX transmission flag associated with a downlink hybrid automatic repeat request (HARQ) process, the value of the cell DTX transmission flag comprising a first value or a second value. In a nineteenth additional aspect, alone or in combination with the eighteenth aspect, the first value is associated with an availability of the downlink HARQ process for a new MAC PDU during a cell DTX non-active time of the cell DTX cycle. In a twentieth additional aspect, alone or in combination with the nineteenth aspect, the second value is associated with an unavailability of the downlink HARQ process for the new MAC PDU. In a twenty-first additional aspect, alone or in combination with one or more of the nineteenth through twentieth aspects, the second value is associated with an availability of the HARQ process for logical channel prioritization data having a priority higher than a priority of the new MAC PDU.

In a twenty-second additional aspect, alone or in combination with one or more of the eighteenth through twenty-first aspects, process 1000 includes transmitting an uplink signal during a cell DTX non-active time associated with the cell DTX cycle, wherein setting the value of the cell DTX transmission flag comprises setting the value to the second value in association with transmitting the uplink signal during the cell DTX non-active time. In a twenty-third additional aspect, alone or in combination with one or more of the eighteenth through twenty-second aspects, setting the value of the cell DTX transmission flag comprises setting the value to the second value in association with a start time of a cell DTX non-active time occurring prior to an expiration of a UE DRX HARQ RTT timer. In a twenty-fourth additional aspect, alone or in combination with one or more of the eighteenth through twenty-third aspects, setting the value of the cell DTX transmission flag comprises setting the value to the second value in association with a start time of a cell DTX non-active time occurring prior to an expiration of a UE DRX retransmission timer. In a twenty-fifth additional aspect, alone or in combination with one or more of the eighteenth through twenty-fourth aspects, setting the value of the cell DTX transmission flag comprises setting the value to the first value in association with a start of a cell DTX active time associated with the cell DTX cycle.

In a twenty-sixth additional aspect, alone or in combination with one or more of the first through twenty-fifth aspects, the at least one UE DRX timer comprises a dedicated cell DTX retransmission timer, wherein the UE is configured to monitor, in association with the cell DTX retransmission timer, a specified quantity of PDCCH occasions during a cell DTX non-active time associated with the cell DTX cycle. In a twenty-seventh additional aspect, alone or in combination with the twenty-sixth aspect, process 1000 includes discontinuing monitoring the PDCCH in association with receiving a PDCCH communication during a cell DTX active time. In a twenty-eighth additional aspect, alone or in combination with one or more of the twenty-sixth through twenty-seventh aspects, process 1000 includes discontinuing monitoring the PDCCH in association with a start time of the cell DTX non-active time occurring prior to an occurrence of the specified quantity of PDCCH occasions. In a twenty-ninth additional aspect, alone or in combination with one or more of the twenty-sixth through twenty-eighth aspects, the second configuration information indicates the specified quantity of PDCCH occasions.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
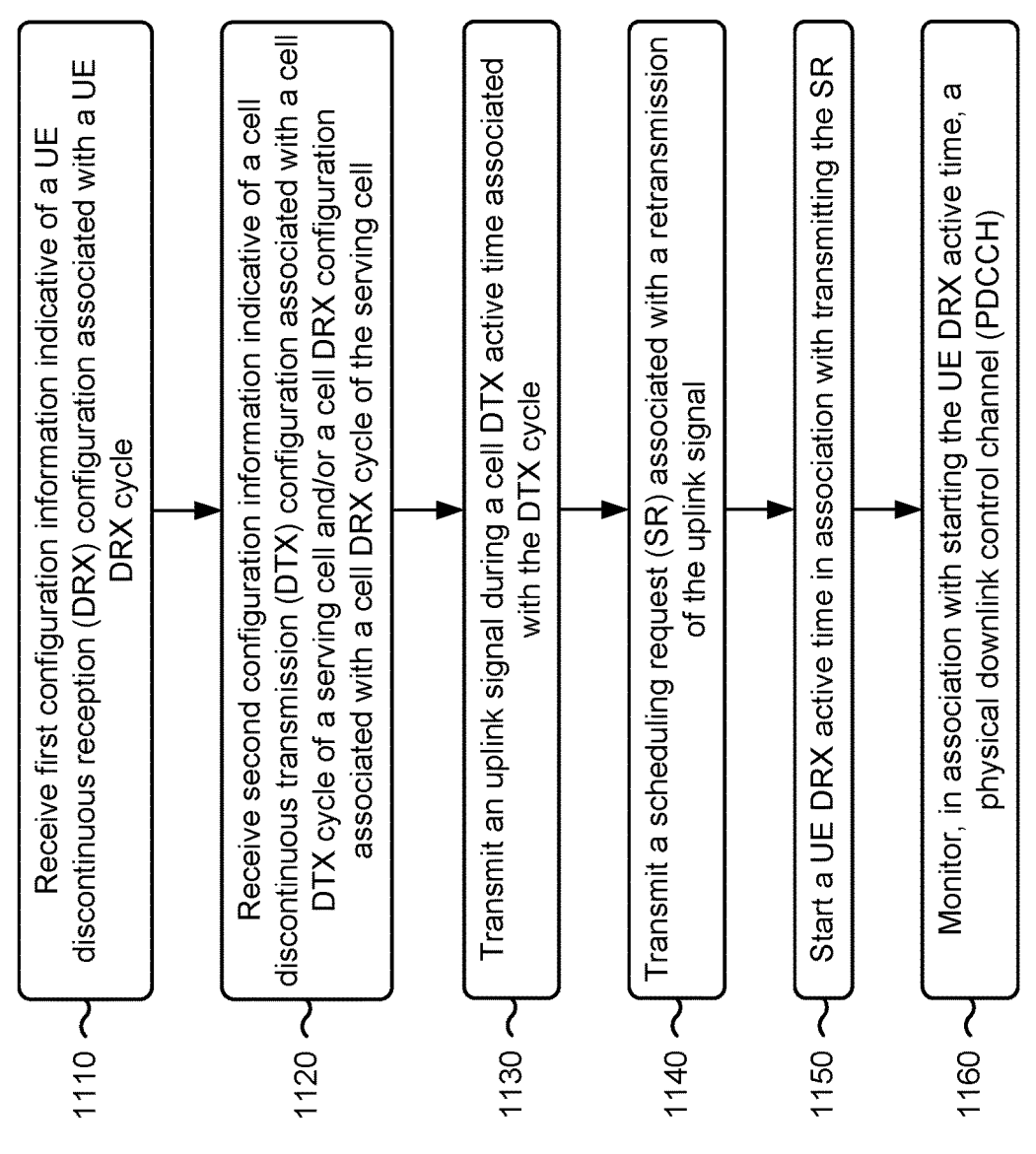
FIG. 11 is a flowchart illustrating an example process performed, for example, by a UE that supports DRX configurations in accordance with the present disclosure.

FIG. 11 is a flowchart illustrating an example process 1100 performed, for example, by a UE that supports DRX configurations in accordance with the present disclosure. Example process 1100 is an example where the UE (for example, UE 120) performs operations associated with UE DRX timing in association with a cell DTX configuration and/or a cell DRX configuration.

As shown in FIG. 11, in some aspects, process 1100 may include receiving first configuration information indicative of a UE DRX configuration associated with a UE DRX cycle (block 1110). For example, the UE (such as by using communication manager 1208 or reception component 1202, depicted in FIG. 12) may receive first configuration information indicative of a UE DRX configuration associated with a UE DRX cycle, as described above.

As further shown in FIG. 11, in some aspects, process 1100 may include receiving second configuration information indicative of a cell DTX configuration associated with a cell DTX cycle of a serving cell and/or a cell DRX configuration associated with a cell DRX cycle of the serving cell (block 1120). For example, the UE (such as by using communication manager 1208 or reception component 1202, depicted in FIG. 12) may receive second configuration information indicative of a cell DTX configuration associated with a cell DTX cycle of a serving cell and/or a cell DRX configuration associated with a cell DRX cycle of the serving cell, as described above.

As further shown in FIG. 11, in some aspects, process 1100 may include transmitting an uplink signal during a cell DTX active time associated with the DTX cycle (block 1130). For example, the UE (such as by using communication manager 1208 or transmission component 1204, depicted in FIG. 12) may transmit an uplink signal during a cell DTX active time associated with the DTX cycle, as described above.

As further shown in FIG. 11, in some aspects, process 1100 may include transmitting an SR associated with a retransmission of the uplink signal (block 1140). For example, the UE (such as by using communication manager 1208 or transmission component 1204, depicted in FIG. 12) may transmit an SR associated with a retransmission of the uplink signal, as described above.

As further shown in FIG. 11, in some aspects, process 1100 may include starting a UE DRX active time in association with transmitting the SR (block 1150). For example, the UE (such as by using communication manager 1208, depicted in FIG. 12) may start a UE DRX active time in association with transmitting the SR, as described above.

As further shown in FIG. 11, in some aspects, process 1100 may include monitoring, in association with starting the UE DRX active time, a PDCCH (block 1160).

Figure 12:
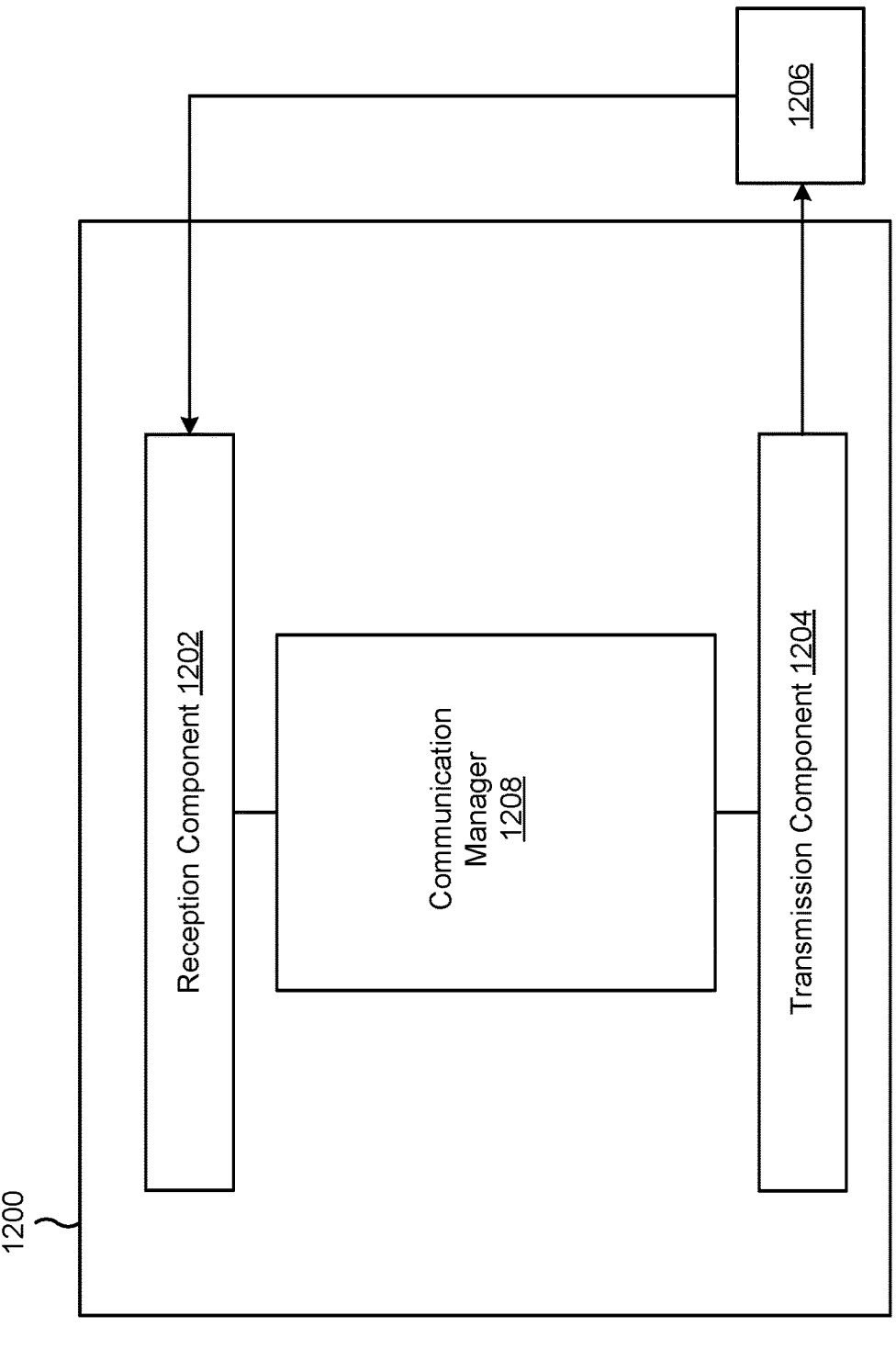
FIG. 12 is a diagram of an example apparatus for wireless communication that supports DRX configurations in accordance with the present disclosure.

For example, the UE (such as by using communication manager 1208 or reception component 1202, depicted in FIG. 12) may monitor, in association with starting the UE DRX active time, a PDCCH, as described above.

Process 1100 may include additional aspects, such as any single aspect or any combination of aspects described below or in connection with one or more other processes described elsewhere herein.

In a first additional aspect, starting the UE DRX active time comprises starting the UE DRX active time in association with a transmission time associated with transmitting the SR occurring during the DTX active time. In a second additional aspect, alone or in combination with the first aspect, starting the UE DRX active time comprises starting a UE cell DTX SR timer in association with transmitting the SR. In a third additional aspect, alone or in combination with one or more of the first and second aspects, process 1100 includes receiving an activation communication, wherein starting the UE DRX active time comprises starting the UE DRX active time in association with receiving the activation communication.

In a fourth additional aspect, alone or in combination with one or more of the first through third aspects, starting the UE DRX active time comprises starting the UE DRX active time in association with an occurrence of an expiration of a cell DTX non-active time associated with the cell DTX cycle. In a fifth additional aspect, alone or in combination with one or more of the first through fourth aspects, transmitting the SR comprises transmitting the SR in a physical uplink control channel (PUCCH) occasion prior to a start of a DTX non-active time, and wherein starting the UE DRX active time comprises starting the UE DRX active time in association with a specified quantity of PDCCH occasions occurring between a time associated with the PUCCH occasion and a start time of the DTX non-active time. In a sixth additional aspect, alone or in combination with the fifth aspect, the second configuration information indicates the specified quantity of PDCCH occasions.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

FIG. 12 is a diagram of an example apparatus 1200 for wireless communication that supports DRX configurations in accordance with the present disclosure. The apparatus 1200 may be a UE, or a UE may include the apparatus 1200. In some aspects, the apparatus 1200 includes a reception component 1202, a transmission component 1204, and a communication manager 1208, which may be in communication with one another (for example, via one or more buses). As shown, the apparatus 1200 may communicate with another apparatus 1206 (such as a UE, a network node, or another wireless communication device) using the reception component 1202 and the transmission component 1204.

In some aspects, the apparatus 1200 may be configured to and/or operable to perform one or more operations described herein in connection with FIGS. 6-9.

Additionally or alternatively, the apparatus 1200 may be configured to and/or operable to perform one or more processes described herein, such as process 1000 of FIG. 10, and/or process 1100 of FIG. 11. In some aspects, the apparatus 1200 may include one or more components of the UE described above in connection with FIG. 2.

The reception component 1202 may receive communications, such as reference signals, control information, and/or data communications, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, and/or a memory of the UE described above in connection with FIG. 2.

The transmission component 1204 may transmit communications, such as reference signals, control information, and/or data communications, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, and/or a memory of the UE described above in connection with FIG. 2. In some aspects, the transmission component 1204 may be co-located with the reception component 1202 in a transceiver.

The communication manager 140 may receive or may cause the reception component 1202 to receive first configuration information indicative of a UE DRX configuration. The communication manager 140 may receive or may cause the reception component 1202 to receive second configuration information indicative of a cell DTX configuration associated with a cell DTX cycle of a serving cell and/or a cell DRX configuration associated with a cell DRX cycle of the serving cell. The communication manager 140 may modify, in association with at least one of the cell DTX cycle or the cell DRX cycle, at least one UE DRX timer associated with an activity state of a UE DRX cycle associated with the UE DRX configuration. The communication manager 140 may monitor, in association with modifying the at least one UE DRX timer, a PDCCH during a UE active time. In some aspects, the communication manager 140 may perform one or more operations described elsewhere herein as being performed by one or more components of the communication manager 140.

The communication manager 140 may receive or may cause the reception component 1202 to receive first configuration information indicative of a UE DRX configuration associated with a UE DRX cycle. The communication manager 140 may receive or may cause the reception component 1202 to receive second configuration information indicative of a cell DTX configuration associated with a cell DTX cycle of a serving cell and/or a cell DRX configuration associated with a cell DRX cycle of the serving cell. The communication manager 140 may transmit or may cause the transmission component 1204 to transmit an uplink signal during a cell DTX active time associated with the DTX cycle. The communication manager 140 may transmit or may cause the transmission component 1204 to transmit an SR associated with a retransmission of the uplink signal. The communication manager 140 may start a UE DRX active time in association with transmitting the SR. The communication manager 140 may monitor, in association with starting the UE DRX active time, a PDCCH. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 1208 includes a set of components. Alternatively, the set of components may be separate and distinct from the communication manager 1208. In some aspects, one or more components of the set of components may include or may be implemented within a controller/processor, a memory, of the UE described above in connection with FIG. 2. Additionally or alternatively, one or more components of the set of components may be implemented at least in part as software stored in a memory.

For example, a component (or a portion of a component) may be implemented as instructions or code stored in a non-transitory computer-readable medium and executable by a controller or a processor to perform the functions or operations of the component.

The reception component 1202 may receive first configuration information indicative of a UE DRX configuration. The reception component 1202 may receive second configuration information indicative of a cell DTX configuration associated with a cell DTX cycle of a serving cell and/or a cell DRX configuration associated with a cell DRX cycle of the serving cell. The communication manager 1208 may modify, in association with at least one of the cell DTX cycle or the cell DRX cycle, at least one UE DRX timer associated with an activity state of a UE DRX cycle associated with the UE DRX configuration. The communication manager 1208 and/or the reception component 1202 may monitor, in association with modifying the at least one UE DRX timer, a PDCCH during a UE active time.

The reception component 1202 may receive third configuration information indicative of at least one of an additional cell DTX configuration or a cell DRX configuration, wherein the at least one of the additional cell DTX configuration or the cell DRX configuration is associated with the second UE DRX cell group. The communication manager 1208 may transition the UE, in association with stopping the first UE DRX inactivity timer and the second UE DRX inactivity timer, to a long DRX cycle. The communication manager 1208 may transition the UE, in association with the first configuration information and further in association with stopping the first UE DRX inactivity timer and the second UE DRX inactivity timer, to a short DRX cycle.

The communication manager 1208 may stop, in association with a start time of a cell DTX non-active time of the cell DTX cycle occurring prior to an expiration of the UE DRX HARQ RTT timer, the UE DRX HARQ RTT timer at the start time of the cell DTX non-active time. The communication manager 1208 may refrain, in association with a start time of a cell DTX non-active time of the cell DTX cycle occurring prior to an expiration of the UE DRX HARQ RTT timer, from starting the UE DRX retransmission timer. The transmission component 1204 may transmit an uplink signal during a cell DTX non-active time associated with at least one of the cell DTX cycle or the cell DRX cycle.

The communication manager 1208 may refrain from starting, in association with transmitting the uplink signal during the cell DTX non-active time, the UE DRX HARQ RTT timer. The communication manager 1208 may stop, in association with a start time of a cell DTX non-active time of the cell DTX cycle occurring prior to an expiration of the UE DRX HARQ RTT timer, the UE DRX retransmission timer at the start time of the cell DTX non-active time. The communication manager 1208 may set a value of a cell DTX transmission flag associated with a downlink HARQ process, the value of the cell DTX transmission flag comprising a first value or a second value. The transmission component 1204 may transmit an uplink signal during a cell DTX non-active time associated with the cell DTX cycle, wherein setting the value of the cell DTX transmission flag comprises setting the value to the second value in association with transmitting the uplink signal during the cell DTX non-active time. The reception component 1202 may discontinue monitoring the PDCCH in association with receiving a PDCCH communication during a cell DTX active time. The reception component 1202 may discontinue monitoring the PDCCH in association with a start time of the cell DTX non-active time occurring prior to an occurrence of the specified quantity of PDCCH occasions.

The reception component 1202 may receive first configuration information indicative of a UE DRX configuration associated with a UE DRX cycle. The reception component 1202 may receive second configuration information indicative of a cell DTX configuration associated with a cell DTX cycle of a serving cell and/or a cell DRX configuration associated with a cell DRX cycle of the serving cell. The transmission component 1204 may transmit an uplink signal during a cell DTX active time associated with the DTX cycle. The transmission component 1204 may transmit an SR associated with a retransmission of the uplink signal. The communication manager 1208 may start a UE DRX active time in association with transmitting the SR. The reception component 1202 may monitor, in association with starting the UE DRX active time, a PDCCH. The reception component 1202 may receive an activation communication, wherein starting the UE DRX active time comprises starting the UE DRX active time in association with receiving the activation communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving first configuration information indicative of a UE discontinuous reception (DRX) configuration; receiving second configuration information indicative of a cell discontinuous transmission (DTX) configuration associated with a cell DTX cycle of a serving cell and/or a cell DRX configuration associated with a cell DRX cycle of the serving cell; modifying, in association with at least one of the cell DTX cycle or the cell DRX cycle, at least one UE DRX timer associated with an activity state of a UE discontinuous reception (DRX) cycle associated with the UE DRX configuration; and monitoring, in association with modifying the at least one UE DRX timer, a physical downlink control channel (PDCCH) during a UE active time.

Aspect 2: The method of Aspect 1, wherein modifying the at least one UE DRX timer comprises modifying the at least one UE DRX timer in association with the serving cell being a special cell.

Aspect 3: The method of either of claims 1 or 2, wherein the UE DRX configuration is associated with a first UE DRX cell group and a second UE DRX cell group, and wherein the cell DTX configuration is associated with the first UE DRX cell group.

Aspect 4: The method of Aspect 3, further comprising receiving third configuration information indicative of at least one of an additional cell DTX configuration or a cell DRX configuration, wherein the at least one of the additional cell DTX configuration or the cell DRX configuration is associated with the second UE DRX cell group.

Aspect 5: The method of either of Aspects 3 or 4, wherein the at least one UE DRX timer comprises a first UE DRX on duration timer associated with the first UE DRX cell group and a second UE DRX on duration timer associated with the second UE DRX cell group, the method further comprising stopping, in association with a start time of a cell DTX active time associated with the cell DTX cycle occurring during the UE active time, the first UE DRX on duration timer and the second UE DRX on duration timer.

Aspect 6: The method of either of Aspects 3 or 4, wherein the at least one UE DRX timer comprises a first UE DRX inactivity timer associated with the first UE DRX cell group and a second UE DRX inactivity timer associated with the second UE DRX cell group, the method further comprising stopping, in association with a start time of a cell DTX active time associated with the cell DTX cycle occurring during the UE active time, the first UE DRX inactivity timer and the second UE DRX inactivity timer.

Aspect 7: The method of Aspect 6, further comprising transitioning the UE, in association with stopping the first UE DRX inactivity timer and the second UE DRX inactivity timer, to a long DRX cycle.

Aspect 8: The method of Aspect 7, wherein the long DRX cycle comprises a default DRX cycle.

Aspect 9: The method of any of Aspects 6-8, further comprising transitioning the UE, in association with the first configuration information and further in association with stopping the first UE DRX inactivity timer and the second UE DRX inactivity timer, to a short DRX cycle.

Aspect 10: The method of Aspect 9, wherein the at least one UE DRX timer comprises a UE DRX short cycle timer associated with the short DRX cycle, the method further comprising: stopping, in association with a start time of a cell DTX non-active time associated with the cell DTX cycle occurring prior to an expiration of the UE DRX short cycle timer, the UE DRX short cycle timer; and transitioning the UE, in association with stopping the UE DRX short cycle timer, to a long DRX cycle.

Aspect 11: The method of Aspect 10, wherein a next active time associated with the UE DRX cycle has a start time associated with a start time of a next cell DTX active time.

Aspect 12: The method of any of Aspects 1-11, wherein the at least one UE DRX timer comprises at least one of a UE DRX hybrid automatic repeat request (HARQ) round trip (RTT) timer or a UE DRX retransmission timer.

Aspect 13: The method of Aspect 12, the method further comprising stopping, in association with a start time of a cell DTX non-active time of the cell DTX cycle occurring prior to an expiration of the UE DRX HARQ RTT timer, the UE DRX HARQ RTT timer at the start time of the cell DTX non-active time.

Aspect 14: The method of Aspect 13, further comprising refraining, in association with a start time of a cell DTX non-active time of the cell DTX cycle occurring prior to an expiration of the UE DRX HARQ RTT timer, from starting the UE DRX retransmission timer.

Aspect 15: The method of any of Aspects 12-14, further comprising: transmitting an uplink signal during a cell DTX non-active time associated with at least one of the cell DTX cycle or the cell DRX cycle; and refraining from starting, in association with transmitting the uplink signal during the cell DTX non-active time, the UE DRX HARQ RTT timer.

Aspect 16: The method of any of Aspects 12-15, the method further comprising stopping, in association with a start time of a cell DTX non-active time of the cell DTX cycle occurring prior to an expiration of the UE DRX HARQ RTT timer, the UE DRX retransmission timer at the start time of the cell DTX non-active time.

Aspect 17: The method of any of Aspects 12-16, wherein the UE DRX HARQ RTT timer comprises a UE DRX HARQ RTT uplink timer or a UE DRX HARQ RTT downlink timer.

Aspect 18: The method of any of Aspects 12-16, wherein the UE DRX retransmission timer comprises a UE DRX retransmission uplink timer or a UE DRX retransmission downlink timer.

Aspect 19: The method of any of Aspects 1-18, further comprising setting a value of a cell DTX transmission flag associated with a downlink hybrid automatic repeat request (HARQ) process, the value of the cell DTX transmission flag comprising a first value or a second value.

Aspect 20: The method of Aspect 19, wherein the first value is associated with an availability of the downlink HARQ process for a new medium access control (MAC) protocol data unit (PDU) during a cell DTX non-active time of the cell DTX cycle.

Aspect 21: The method of Aspect 20, wherein the second value is associated with an unavailability of the downlink HARQ process for the new MAC PDU.

Aspect 22: The method of either of Aspects 20 or 21, wherein the second value is associated with an availability of the HARQ process for logical channel prioritization data having a priority higher than a priority of the new MAC PDU.

Aspect 23: The method of any of Aspects 19-22, further comprising transmitting an uplink signal during a cell DTX non-active time associated with the cell DTX cycle, wherein setting the value of the cell DTX transmission flag comprises setting the value to the second value in association with transmitting the uplink signal during the cell DTX non-active time.

Aspect 24: The method of any of Aspects 19-23, wherein setting the value of the cell DTX transmission flag comprises setting the value to the second value in association with a start time of a cell DTX non-active time occurring prior to an expiration of a ULE DRX HARQ RTT timer.

Aspect 25: The method of any of Aspects 19-24, wherein setting the value of the cell DTX transmission flag comprises setting the value to the second value in association with a start time of a cell DTX non-active time occurring prior to an expiration of a ULE DRX retransmission timer.

Aspect 26: The method of any of Aspects 19-25, wherein setting the value of the cell DTX transmission flag comprises setting the value to the first value in association with a start of a cell DTX active time associated with the cell DTX cycle.

Aspect 27: The method of any of Aspects 1-26, wherein the at least one UE DRX timer comprises a dedicated cell DTX retransmission timer, wherein the UE is configured to monitor, in association with the cell DTX retransmission timer, a specified quantity of PDCCH occasions during a cell DTX non-active time associated with the cell DTX cycle.

Aspect 28: The method of Aspect 27, further comprising discontinuing monitoring the PDCCH in association with receiving a PDCCH communication during a cell DTX active time.

Aspect 29: The method of either of claims 27 or 28, further comprising discontinuing monitoring the PDCCH in association with a start time of the cell DTX non-active time occurring prior to an occurrence of the specified quantity of PDCCH occasions.

Aspect 30: The method of any of Aspects 27-29, wherein the second configuration information indicates the specified quantity of PDCCH occasions.

Aspect 31: A method of wireless communication performed by a user equipment (UE), comprising: receiving first configuration information indicative of a UE discontinuous reception (DRX) configuration associated with a UE DRX cycle; receiving second configuration information indicative of a cell discontinuous transmission (DTX) configuration associated with a cell DTX cycle of a serving cell and/or a cell DRX configuration associated with a cell DRX cycle of the serving cell; transmitting an uplink signal during a cell DTX active time associated with the DTX cycle; transmitting a scheduling request (SR) associated with a retransmission of the uplink signal; starting a UE DRX active time in association with transmitting the SR; and monitoring, in association with starting the UE DRX active time, a physical downlink control channel (PDCCH).

Aspect 32: The method of Aspect 31, wherein starting the UE DRX active time comprises starting the UE DRX active time in association with a transmission time associated with transmitting the SR occurring during the DTX active time.

Aspect 33: The method of either of Aspect 31 or 32, wherein starting the UE DRX active time comprises starting a UE cell DTX SR timer in association with transmitting the SR.

Aspect 34: The method of any of Aspects 31-33, further comprising receiving an activation communication, wherein starting the UE DRX active time comprises starting the UE DRX active time in association with receiving the activation communication.

Aspect 35: The method of any of Aspects 31-34, wherein starting the UE DRX active time comprises starting the UE DRX active time in association with an occurrence of an expiration of a cell DTX non-active time associated with the cell DTX cycle.

Aspect 36: The method of any of Aspects 31-35, wherein transmitting the SR comprises transmitting the SR in a physical uplink control channel (PUCCH) occasion prior to a start of a DTX non-active time, and wherein starting the UE DRX active time comprises starting the UE DRX active time in association with a specified quantity of PDCCH occasions occurring between a time associated with the PUCCH occasion and a start time of the DTX non-active time.

Aspect 37: The method of Aspect 36, wherein the second configuration information indicates the specified quantity of PDCCH occasions.

Aspect 38: An apparatus for wireless communication at a device, comprising a processor; memory coupled with the processor; and instructions stored in the memory and executable by the processor to cause the apparatus to perform the method of one or more of Aspects 1-30.

Aspect 39: A device for wireless communication, comprising a memory and one or more processors coupled to the memory, the one or more processors configured to perform the method of one or more of Aspects 1-30.

Aspect 40: An apparatus for wireless communication, comprising at least one means for performing the method of one or more of Aspects 1-30.

Aspect 41: A non-transitory computer-readable medium storing code for wireless communication, the code comprising instructions executable by a processor to perform the method of one or more of Aspects 1-30.

Aspect 42: A non-transitory computer-readable medium storing a set of instructions for wireless communication, the set of instructions comprising one or more instructions that, when executed by one or more processors of a device, cause the device to perform the method of one or more of Aspects 1-30.

Aspect 43: An apparatus for wireless communication at a device, comprising a processor; memory coupled with the processor; and instructions stored in the memory and executable by the processor to cause the apparatus to perform the method of one or more of Aspects 31-37.

Aspect 44: A device for wireless communication, comprising a memory and one or more processors coupled to the memory, the one or more processors configured to perform the method of one or more of Aspects 31-37.

Aspect 45: An apparatus for wireless communication, comprising at least one means for performing the method of one or more of Aspects 31-37.

Aspect 46: A non-transitory computer-readable medium storing code for wireless communication, the code comprising instructions executable by a processor to perform the method of one or more of Aspects 31-37.

Aspect 47: A non-transitory computer-readable medium storing a set of instructions for wireless communication, the set of instructions comprising one or more instructions that, when executed by one or more processors of a device, cause the device to perform the method of one or more of Aspects 31-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   one or more memories storing processor-readable code; and
   one or more processors coupled with the one or more memories and individually or collectively operable to cause the UE to:
   receive first configuration information indicative of a UE discontinuous reception (DRX) configuration, wherein the UE DRX configuration is associated with a first UE DRX cell group and a second UE DRX cell group;
   receive second configuration information indicative of a cell discontinuous transmission (DTX) configuration associated with a cell DTX cycle of a serving cell and/or a cell DRX configuration associated with a cell DRX cycle of the serving cell, wherein the cell DTX configuration is associated with the first UE DRX cell group;
   modify, in association with at least one of the cell DTX cycle or the cell DRX cycle, at least one UE DRX timer associated with an activity state of a UE DRX cycle associated with the UE DRX configuration; and
   monitor, in association with modifying the at least one UE DRX timer, a physical downlink control channel (PDCCH) during a UE active time.

2. The UE of claim 1, wherein, to cause the UE to modify the at least one UE DRX timer, the one or more processors are operable to cause the UE to modify the at least one UE DRX timer in association with the serving cell being a special cell.

3. The UE of claim 1, wherein the at least one UE DRX timer comprises a first UE DRX on duration timer associated with the first UE DRX cell group and a second UE DRX on duration timer associated with the second UE DRX cell group, and wherein the one or more processors are further operable to cause the UE to stop, in association with a start time of a cell DTX active time associated with the cell DTX cycle occurring during the UE active time, the first UE DRX on duration timer and the second UE DRX on duration timer.

4. The UE of claim 1, wherein the at least one UE DRX timer comprises a first UE DRX inactivity timer associated with the first UE DRX cell group and a second UE DRX inactivity timer associated with the second UE DRX cell group, and wherein the one or more processors are further operable to cause the UE to:
   stop, in association with a start time of a cell DTX active time associated with the cell DTX cycle occurring during the UE active time, the first UE DRX inactivity timer and the second UE DRX inactivity timer; and
   transition the UE, in association with stopping the first UE DRX inactivity timer and the second UE DRX inactivity timer, to a long DRX cycle.

5. The UE of claim 1, wherein the at least one UE DRX timer comprises a UE DRX short cycle timer associated with a short DRX cycle, and wherein the one or more processors are further operable to cause the UE to:

stop, in association with a start time of a cell DTX non-active time associated with the cell DTX cycle occurring prior to an expiration of the UE DRX short cycle timer, the UE DRX short cycle timer; and transition the UE, in association with stopping the UE DRX short cycle timer, to a long DRX cycle, wherein a next active time associated with the UE DRX cycle has a start time associated with a start time of a next cell DTX active time.

6. The UE of claim 1, wherein the at least one UE DRX timer comprises at least one of a UE DRX hybrid automatic repeat request (HARQ) round trip (RTT) timer or a UE DRX retransmission timer.

7. The UE of claim 6, wherein the one or more processors are further operable to cause the UE to:

stop, in association with a start time of a cell DTX non-active time of the cell DTX cycle occurring prior to an expiration of the UE DRX HARQ RTT timer, the UE DRX HARQ RTT timer at the start time of the cell DTX non-active time; and refrain, in association with a start time of a cell DTX non-active time of the cell DTX cycle occurring prior to an expiration of the UE DRX HARQ RTT timer, from starting the UE DRX retransmission timer.

8. The UE of claim 6, wherein the one or more processors are further operable to cause the UE to:

transmit an uplink signal during a cell DTX non-active time associated with at least one of the cell DTX cycle or the cell DRX cycle; and refrain from starting, in association with transmitting the uplink signal during the cell DTX non-active time, the UE DRX HARQ RTT timer.

9. The UE of claim 6, wherein the one or more processors are further operable to cause the UE to stop, in association with a start time of a cell DTX non-active time of the cell DTX cycle occurring prior to an expiration of the UE DRX HARQ RTT timer, the UE DRX retransmission timer at the start time of the cell DTX non-active time, wherein the UE DRX HARQ RTT timer comprises a UE DRX HARQ RTT uplink timer, a UE DRX HARQ RTT downlink timer, a UE DRX retransmission uplink timer, or a UE DRX retransmission downlink timer.

10. The UE of claim 1, wherein the one or more processors are further operable to cause the UE to set a value of a cell DTX transmission flag associated with a downlink hybrid automatic repeat request (HARQ) process, the value of the cell DTX transmission flag comprising a first value or a second value, wherein the first value is associated with an availability of the downlink HARQ process for a new medium access control (MAC) protocol data unit (PDU) during a cell DTX non-active time of the cell DTX cycle.

11. The UE of claim 10, wherein the second value is associated with an unavailability of the downlink HARQ process for the new MAC PDU.

12. The UE of claim 10, wherein the second value is associated with an availability of the downlink HARQ process for logical channel prioritization data having a priority higher than a priority of the new MAC PDU.

13. The UE of claim 10, wherein the one or more processors are further operable to cause the UE to transmit an uplink signal during a cell DTX non-active time associated with the cell DTX cycle, wherein setting the value of the cell DTX transmission flag comprises setting the value to the second value in association with transmitting the uplink signal during the cell DTX non-active time.

14. The UE of claim 10, wherein, to cause the UE to set the value of the cell DTX transmission flag, the one or more processors are operable to cause the UE to set the value to the second value in association with a start time of a cell DTX non-active time occurring prior to an expiration of a UE DRX HARQ RTT timer or a UE DRX retransmission timer.

15. The UE of claim 10, wherein, to cause the UE to set the value of the cell DTX transmission flag, the one or more processors are operable to cause the UE to set the value to the first value in association with a start of a cell DTX active time associated with the cell DTX cycle.

16. The UE of claim 1, wherein the at least one UE DRX timer comprises a dedicated cell DTX retransmission timer, and wherein the one or more processors are further operable to cause the UE to monitor, in association with the dedicated cell DTX retransmission timer, a specified quantity of PDCCH occasions during a cell DTX non-active time associated with the cell DTX cycle.

17. The UE of claim 16, wherein the one or more processors are further operable to cause the UE to discontinue monitoring the PDCCH in association with receiving a PDCCH communication during a cell DTX active time.

18. The UE of claim 16, wherein the one or more processors are further operable to cause the UE to discontinue monitoring the PDCCH in association with a start time of the cell DTX non-active time occurring prior to an occurrence of the specified quantity of PDCCH occasions.

19. A user equipment (UE) for wireless communication, comprising:

one or more memories storing processor-readable code; and one or more processors coupled with the one or more memories and operable to cause the UE to:

receive first configuration information indicative of a UE discontinuous reception (DRX) configuration associated with a UE DRX cycle;

receive second configuration information indicative of a cell discontinuous transmission (DTX) configuration associated with a cell DTX cycle of a serving cell and/or a cell DRX configuration associated with a cell DRX cycle of the serving cell;

transmit an uplink signal during a cell DTX active time associated with the cell DTX cycle;

transmit a scheduling request (SR) associated with a retransmission of the uplink signal;

start a UE DRX active time in association with a specified quantity of physical downlink control channel (PDCCH) occasions occurring between a time associated with a physical uplink control channel (PUCCH) occasion and a start time of a DTX non-active time; and monitor, in association with starting the UE DRX active time, a PDCCH.

20. The UE of claim 19, wherein the one or more processors, to cause the UE to start the UE DRX active time, are operable to cause the UE to start the UE DRX active time in association with a transmission time associated with transmitting the SR occurring during the cell DTX active time.

21. The UE of claim 19, wherein the one or more processors, to cause the UE to start the UE DRX active time, are operable to cause the UE to start a UE cell DTX SR timer in association with transmitting the SR.

22. The UE of claim 19, wherein the one or more processors are further operable to cause the UE to receive an activation communication, wherein the one or more processors, to cause the UE to start the UE DRX active time, are operable to cause the UE to start the UE DRX active time in association with receiving the activation communication.

23. The UE of claim 19, wherein the one or more processors, to cause the UE to start the UE DRX active time, are operable to cause the UE to start the UE DRX active time in association with an occurrence of an expiration of a cell DTX non-active time associated with the cell DTX cycle.

24. The UE of claim 19, wherein the one or more processors, to cause the UE to transmit the SR, are operable to cause the UE to transmit the SR in a PUUCH occasion prior to a start of the DTX non-active time.

25. The UE of claim 24, wherein the second configuration information indicates the specified quantity of PDCCH occasions.

26. A method of wireless communication performed by a user equipment (UE), comprising:
  receiving first configuration information indicative of a UE discontinuous reception (DRX) configuration;
  receiving second configuration information indicative of a cell discontinuous transmission (DTX) configuration associated with a cell DTX cycle of a serving cell and/or a cell DRX configuration associated with a cell DRX cycle of the serving cell;
  modifying, in association with at least one of the cell DTX cycle or the cell DRX cycle, at least one UE DRX timer associated with an activity state of a UE discontinuous reception (DRX) cycle associated with the UE DRX configuration; and
  monitoring, in association with modifying the at least one UE DRX timer, a specified quantity physical downlink control channel (PDCCH) during a cell DTX non-active time associated with the cell DTX cycle.

27. The method of claim 26, wherein the at least one UE DRX timer comprises a dedicated cell DTX retransmission timer.

28. A method of wireless communication performed by a user equipment (UE), comprising:
  receiving first configuration information indicative of a UE discontinuous reception (DRX) configuration associated with a UE DRX cycle;
  receiving second configuration information indicative of a cell discontinuous transmission (DTX) configuration associated with a cell DTX cycle of a serving cell and/or a cell DRX configuration associated with a cell DRX cycle of the serving cell;
  transmitting an uplink signal during a cell DTX active time associated with the cell DTX cycle;
  transmitting a scheduling request (SR) associated with a retransmission of the uplink signal;
  starting a UE DRX active time in association with a specified quantity of physical downlink control channel (PDCCH) occasions occurring between a time associated with a physical uplink control channel (PUCCH) occasion and a start time of a DTX non-active time; and
  monitoring, in association with starting the UE DRX active time, a PDCCH.

29. The method of claim 28, wherein starting the UE DRX active time comprises starting the UE DRX active time in association with a transmission time associated with transmitting the SR occurring during the cell DTX active time.

30. The method of claim 28, wherein starting the UE DRX active time comprises starting a UE cell DTX SR timer in association with transmitting the SR.

* * * * *